United States Patent
Roman

(10) Patent No.: US 8,290,034 B2
(45) Date of Patent: *Oct. 16, 2012

(54) VIDEO TRANSMISSION AND DISPLAY INCLUDING BIT-WISE SUB-SAMPLING VIDEO COMPRESSION

(75) Inventor: Kendyl A. Roman, Sunnyvale, CA (US)

(73) Assignee: Zin Stai Pte. In, LLC, Dover, DE (US)

( * ) Notice: Subject to any disclaimer, the term of this patent is extended or adjusted under 35 U.S.C. 154(b) by 1611 days.

This patent is subject to a terminal disclaimer.

(21) Appl. No.: 11/262,106

(22) Filed: Oct. 27, 2005

(65) Prior Publication Data

US 2006/0114987 A1 Jun. 1, 2006

Related U.S. Application Data

(63) Continuation-in-part of application No. 09/467,721, filed on Dec. 20, 1999, now Pat. No. 7,233,619.

(60) Provisional application No. 60/113,051, filed on Dec. 21, 1998.

(51) Int. Cl.
*H04N 7/12* (2006.01)

(52) U.S. Cl. ......... 375/240.01; 375/240.21; 375/240.26; 375/240.23; 700/94; 382/245; 382/246; 382/235

(58) Field of Classification Search ............. 375/240.23, 375/240.21, 240.26; 382/235, 245, 246

See application file for complete search history.

(56) References Cited

U.S. PATENT DOCUMENTS

| | | | |
|---|---|---|---|
| 4,301,469 A | 11/1981 | Modeen et al. | |
| 4,302,775 A | 11/1981 | Widergren et al. | |
| 4,385,363 A | 5/1983 | Widergren et al. | |
| 4,394,774 A | 7/1983 | Widergren et al. | |
| 4,410,916 A | 10/1983 | Pratt et al. | |
| 4,546,385 A | 10/1985 | Anastassiou | |
| 4,550,437 A | 10/1985 | Kobayashi et al. | |
| 4,646,356 A | 2/1987 | Anderson et al. | |
| 4,698,672 A | 10/1987 | Chen et al. | |

(Continued)

FOREIGN PATENT DOCUMENTS

WO 9959472 A1 11/1999

(Continued)

OTHER PUBLICATIONS

Office Action, mailed Dec. 15, 2003, for related U.S. Appl. No. 09/758,573.

(Continued)

*Primary Examiner* — Sath V Perungavoor
*Assistant Examiner* — Geepy Pe
(74) *Attorney, Agent, or Firm* — Schwabe, Williamson & Wyatt, P.C.

(57) ABSTRACT

Methods, medium, and handheld, wireless devices which compress, enhance, encode, transmit, decompress and display digital video images in real time. Real time wireless videoconferences connect multiple handheld video devices. Real time compression is achieved by sub-sampling each frame of a video signal, filtering the pixel values, and encoding. Real time transmission is achieved due to high levels of effective compression. Real time decompression is achieved by decoding and decompressing the encoded data to display high quality images. A receiver can alter various setting including but not limited to the format for the compression, image size, frame rate, brightness and contrast. A zoom control can be used select a portion of interest of video being transmitted or being played back.

35 Claims, 28 Drawing Sheets

U.S. PATENT DOCUMENTS

| | | | |
|---|---|---|---|
| 4,704,628 | A | 11/1987 | Chen et al. |
| 4,743,959 | A | 5/1988 | Frederiksen |
| 5,014,710 | A | 5/1991 | Maslak et al. |
| 5,046,027 | A | 9/1991 | Taaffe et al. |
| 5,047,853 | A | 9/1991 | Hoffert et al. |
| 5,271,072 | A | 12/1993 | Yoshida et al. |
| 5,287,452 | A | 2/1994 | Newman |
| 5,309,232 | A | 5/1994 | Hartung et al. |
| 5,339,392 | A | 8/1994 | Risberg et al. |
| 5,416,602 | A | 5/1995 | Inga et al. |
| 5,471,989 | A | 12/1995 | Roundhill et al. |
| 5,552,832 | A | 9/1996 | Astle |
| 5,581,613 | A | 12/1996 | Nagashima et al. |
| 5,583,561 | A | 12/1996 | Baker et al. |
| 5,586,196 | A * | 12/1996 | Sussman ............... 382/114 |
| 5,619,995 | A | 4/1997 | Lobodzinski |
| 5,621,660 | A | 4/1997 | Chaddha et al. |
| 5,646,618 | A | 7/1997 | Walsh |
| 5,684,968 | A | 11/1997 | Flurry |
| 5,696,940 | A | 12/1997 | Liu et al. |
| 5,715,823 | A | 2/1998 | Wood et al. |
| 5,721,815 | A | 2/1998 | Ottesen et al. |
| 5,754,820 | A | 5/1998 | Yamagami |
| 5,794,072 | A | 8/1998 | Nomura et al. |
| 5,809,145 | A | 9/1998 | Slik et al. |
| 5,812,119 | A | 9/1998 | Tateyama |
| 5,812,788 | A | 9/1998 | Agarwal |
| 5,828,856 | A | 10/1998 | Bowes et al. |
| 5,860,068 | A | 1/1999 | Cook |
| 5,882,206 | A | 3/1999 | Gillio |
| 5,897,498 | A | 4/1999 | Canfield, II et al. |
| 5,920,317 | A | 7/1999 | McDonald |
| 5,959,639 | A | 9/1999 | Wada |
| 5,966,728 | A | 10/1999 | Amini et al. |
| 5,973,750 | A | 10/1999 | Ogawa et al. |
| 5,999,655 | A | 12/1999 | Kalker et al. |
| 6,005,979 | A | 12/1999 | Chang et al. |
| 6,009,346 | A | 12/1999 | Ostrow |
| 6,018,713 | A | 1/2000 | Coli et al. |
| 6,025,854 | A | 2/2000 | Hinz et al. |
| 6,054,990 | A | 4/2000 | Tran |
| 6,058,215 | A | 5/2000 | Schwartz et al. |
| 6,063,032 | A | 5/2000 | Grunwald |
| 6,064,324 | A | 5/2000 | Shimizu et al. |
| 6,078,691 | A | 6/2000 | Luttmer |
| 6,084,598 | A | 7/2000 | Chekerylla |
| 6,091,777 | A | 7/2000 | Guetz et al. |
| 6,115,485 | A | 9/2000 | Dumoulin et al. |
| 6,144,392 | A | 11/2000 | Rogers |
| 6,181,711 | B1 | 1/2001 | Zhang et al. |
| 6,219,358 | B1 | 4/2001 | Pinder et al. |
| 6,230,241 | B1 | 5/2001 | McKenney |
| 6,324,599 | B1 | 11/2001 | Zhou et al. |
| 6,335,990 | B1 | 1/2002 | Chen et al. |
| 6,338,119 | B1 | 1/2002 | Anderson et al. |
| 6,339,616 | B1 | 1/2002 | Kovalev |
| 6,384,862 | B1 | 5/2002 | Brusewitz et al. |
| 6,571,392 | B1 | 5/2003 | Zigmond et al. |
| 6,574,278 | B1 | 6/2003 | McVeigh et al. |
| 6,592,629 | B1 | 7/2003 | Cullen et al. |
| 6,621,933 | B2 | 9/2003 | Chung et al. |
| 6,651,113 | B1 | 11/2003 | Grimsrud |
| 6,894,702 | B2 * | 5/2005 | Stamm et al. ............... 345/613 |
| 7,016,417 | B1 | 3/2006 | Roman et al. |
| 7,257,158 | B1 | 8/2007 | Figuredo et al. |
| 7,308,413 | B1 | 12/2007 | Tota et al. |
| 2007/0223574 | A1 | 9/2007 | Roman et al. |

FOREIGN PATENT DOCUMENTS

| | | | |
|---|---|---|---|
| WO | 0055791 | A1 | 9/2000 |

OTHER PUBLICATIONS

Final Office Action, mailed Aug. 16, 2004, for related U.S. Appl. No. 09/758,573.
Office Action, mailed Jan. 20, 2006, for related U.S. Appl. No. 09/758,573.
Office Action, mailed Sep. 27, 2006, for related U.S. Appl. No. 09/758,573.
Final Office Action, mailed Jun. 14, 2007, for related U.S. Appl. No. 09/758,573.
Office Action, mailed Nov. 24, 2008, for related U.S. Appl. No. 09/758,573.
Final Office Action, mailed May 12, 2009, for related U.S. Appl. No. 09/758,573.
Office Action, mailed Jul. 11, 2002, for related U.S. Appl. No. 09/470,566.
Final Office Action, mailed Mar. 26, 2003, for related U.S. Appl. No. 09/470,566.
Office Action, mailed Dec. 3, 2003, for related U.S. Appl. No. 09/470,566.
Final Office Action, mailed Jul. 14, 2004, for related U.S. Appl. No. 09/470,566.
Office Action, mailed Apr. 8, 2005, for related U.S. Appl. No. 09/470,566.
Notice of Allowability, mailed Aug. 10, 2005, for related U.S. Appl. No. 09/470,566.
Office Action, mailed Jan. 28, 2008, for related U.S. Appl. No. 11/280,656.
Notice of Allowability, mailed Mar. 5, 2009, for related U.S. Appl. No. 11/280,656.
Office Action, mailed Sep. 26, 2002, for related U.S. Appl. No. 09/467,721.
Final office Action, mailed Jan. 29, 2004, for related U.S. Appl. No. 09/467,721.
Office Action, mailed May 24, 2004, for related U.S. Appl. No. 09/467,721.
Office Action, mailed Apr. 20, 2005, for related U.S. Appl. No. 09/467,721.
Office Action, mailed Nov. 29, 2005, for related U.S. Appl. No. 09/467,721.
Notice of Allowability, mailed Aug. 22, 2006, for related U.S. Appl. No. 09/467,721.
Office Action, mailed Nov. 18, 2002, for related U.S. Appl. No. 09/473,190.
Office Action, mailed Dec. 11, 2003, for related U.S. Appl. No. 09/473,190.
Office Action, mailed Jun. 21, 2007, for related U.S. Appl. No. 09/473,190.
Office Action, mailed Jul. 7, 2009, for related U.S. Appl. No. 10/154,775.
Ziv et al.,"Compression of Individual Sequences via Variable-Rate Coding," Sep. 5, 1978, 7 pages, IEEE Transactions on Information Theory, vol. IT-24, No. 5.
Terry A. Welch, "A Technique for High-Performance Data Compression", Jun. 1984, 12 pages, Sperry Research Center, issue of IEEE Computer.
David A. Huffman, "A Method for Construction of Minimum Redundancy Codes", Published in 1952, 4 pages, Proceedings of the I.R.E.
Ziv et al., "A Universal Algorithm for Sequential Data Compression", May 1977, 7 pages, IEEE Transactions on Information Theory, vol. IT-23, No. 3.
Supplemental Notice of Allowance for U.S. Appl. No. 09/467,721, mailed Mar. 6, 2007, 4 pages.
Restriction Requirement for U.S. Appl. No. 09/467,721, mailed Jun. 30, 2003, 4 pages.
Restriction Requirement for U.S. Appl. No. 11/638,989, mailed Nov. 29, 2010, 7 pages.
Non Final Office Action for U.S. Appl. No. 11/638,989 mailed Jan. 11, 2011, 6 pages.
Notice of Allowance, issued in U.S. Appl. No. 11/638,989, mailed Apr. 19, 2011, 6 pages.

* cited by examiner

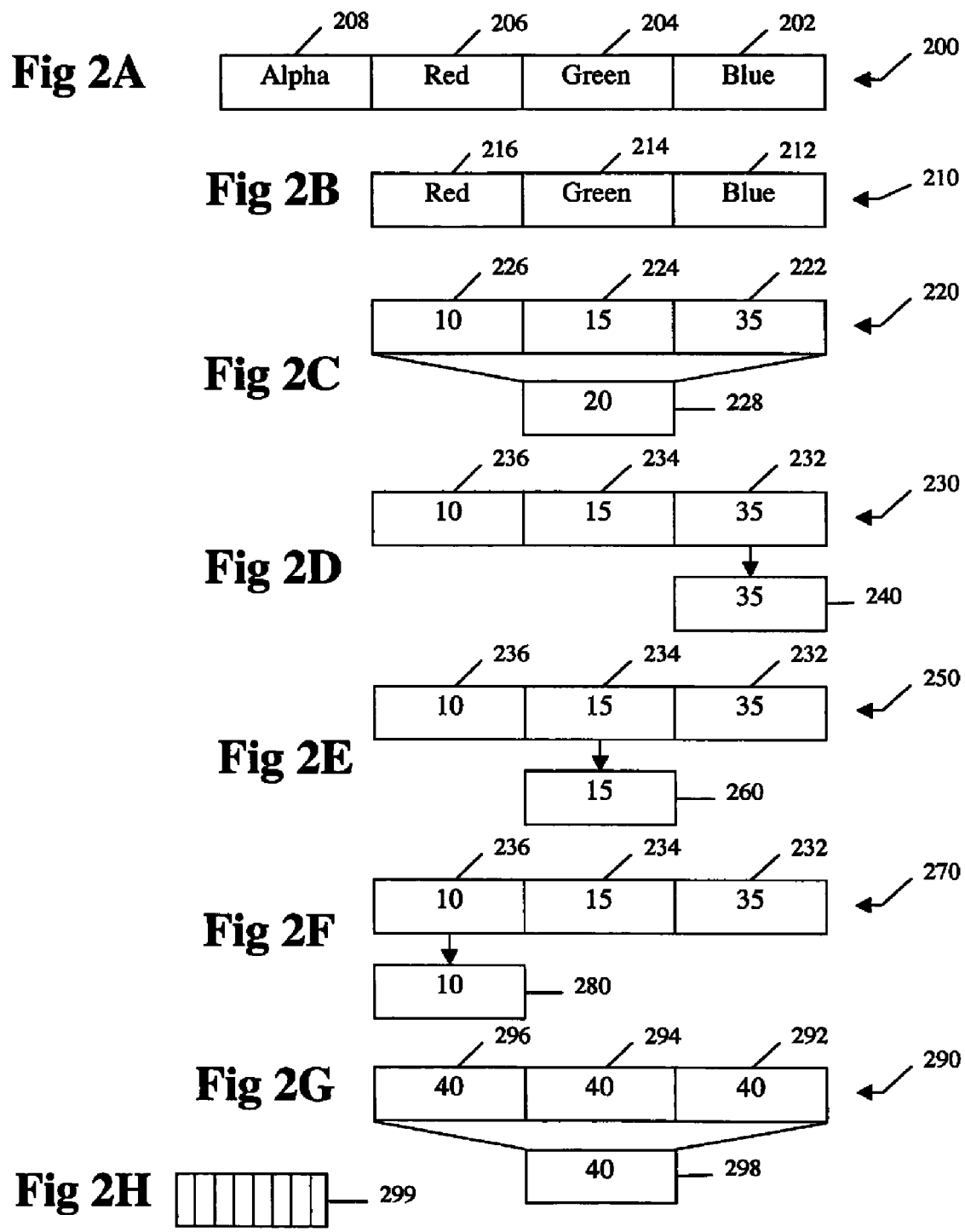

RHN FORMAT

ZL3 (ZL3-5): 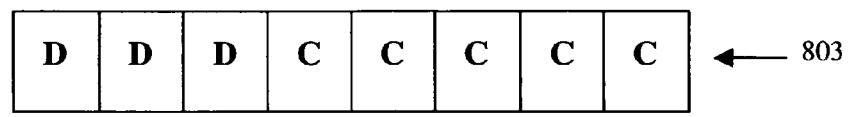 ← 803
ZL4 (ZL4-4): 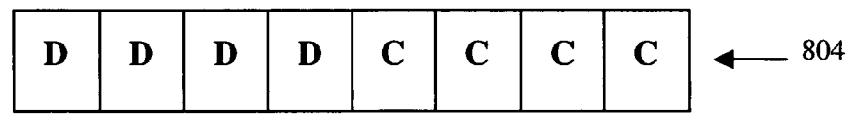 ← 804
ZL5 (ZL5-3): 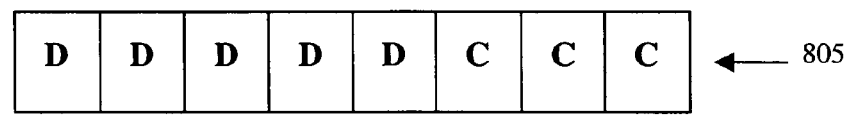 ← 805
ZL8 (ZL8-8): 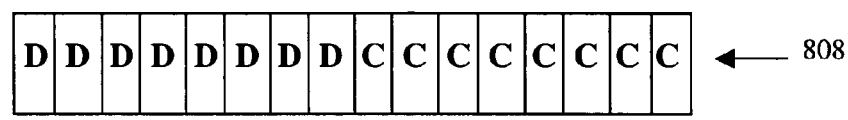 ← 808
ZL9 (ZL9-7): 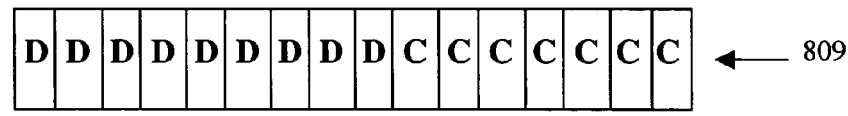 ← 809
ZL12 (ZL12-4): 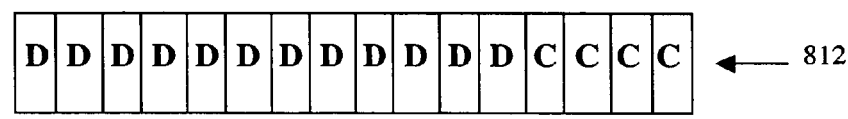 ← 812
Fig 8A

```
// N=3, W=8
unsigned char encodeTable[ ] =
{
    5, 0, 7, 4, 2, 3, 6, 1
};
```

Fig 11A

```
// N=3, U=5
int decodeTable[ ] =
{
    0xff << 24 | 1 << (16+U) | 1 << (8+U) | 1 << U,  // 0 → 1
    0xff << 24 | 7 << (16+U) | 7 << (8+U) | 7 << U,  // 1 → 7
    0xff << 24 | 4 << (16+U) | 4 << (8+U) | 4 << U,  // 2 → 4
    0xff << 24 | 5 << (16+U) | 5 << (8+U) | 5 << U,  // 3 → 5
    0xff << 24 | 3 << (16+U) | 3 << (8+U) | 3 << U,  // 4 → 3
    0xff << 24 | 0 << (16+U) | 0 << (8+U) | 0 << U,  // 5 → 0
    0xff << 24 | 6 << (16+U) | 6 << (8+U) | 6 << U,  // 6 → 6
    0xff << 24 | 2 << (16+U) | 2 << (8+U) | 2 << U   // 7 → 2
};
```

Fig 11B

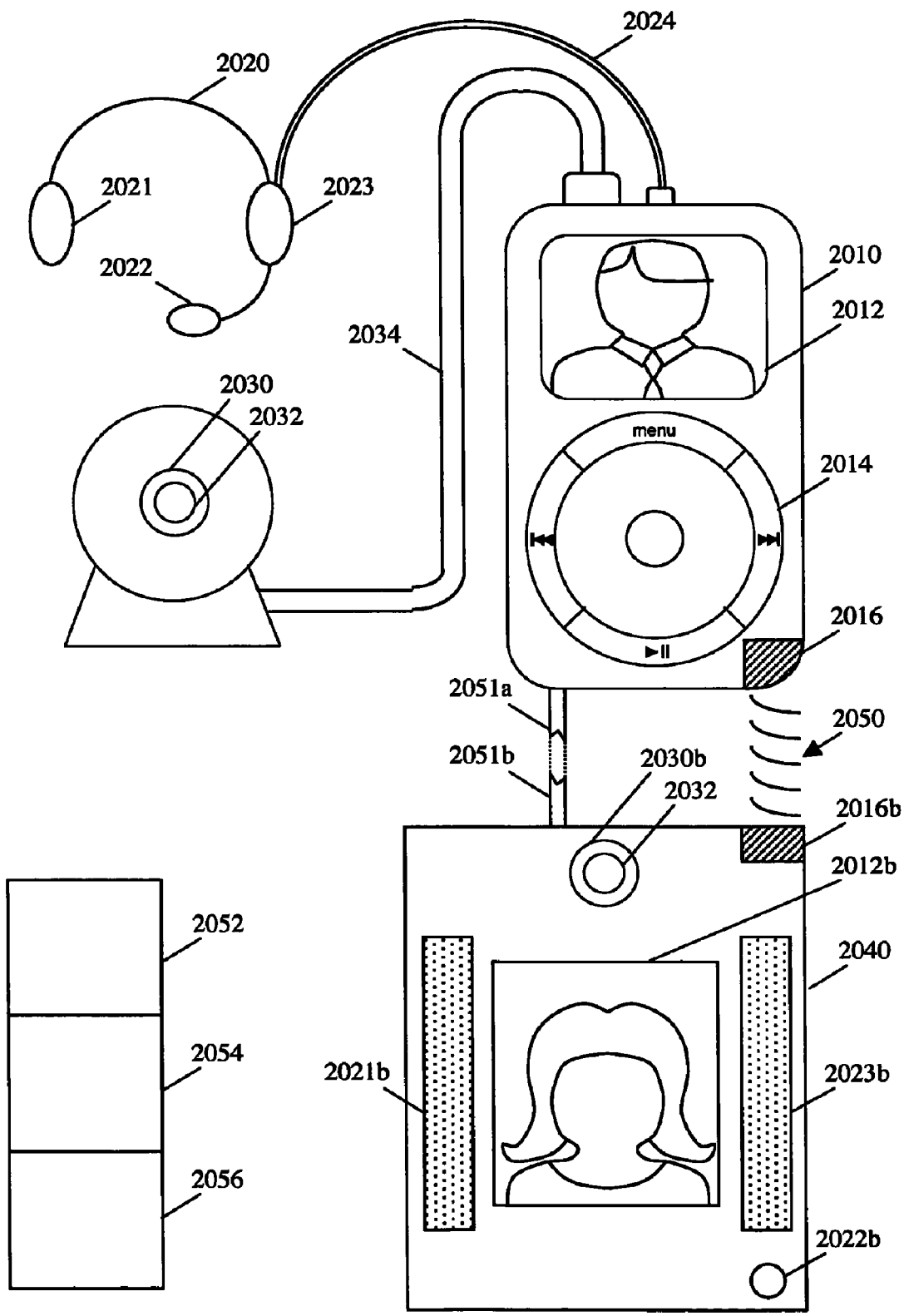
Fig 20A  Fig 20B

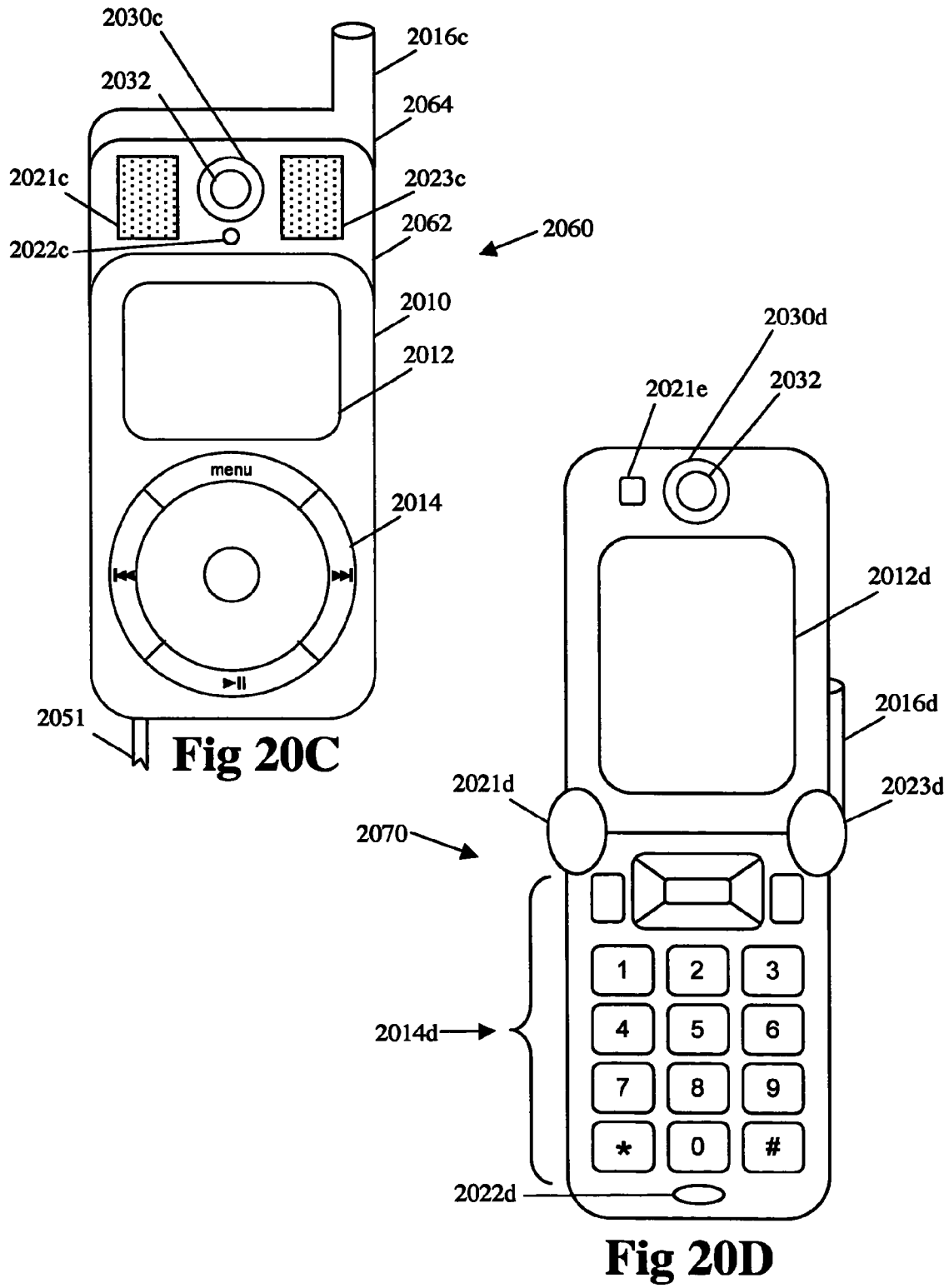

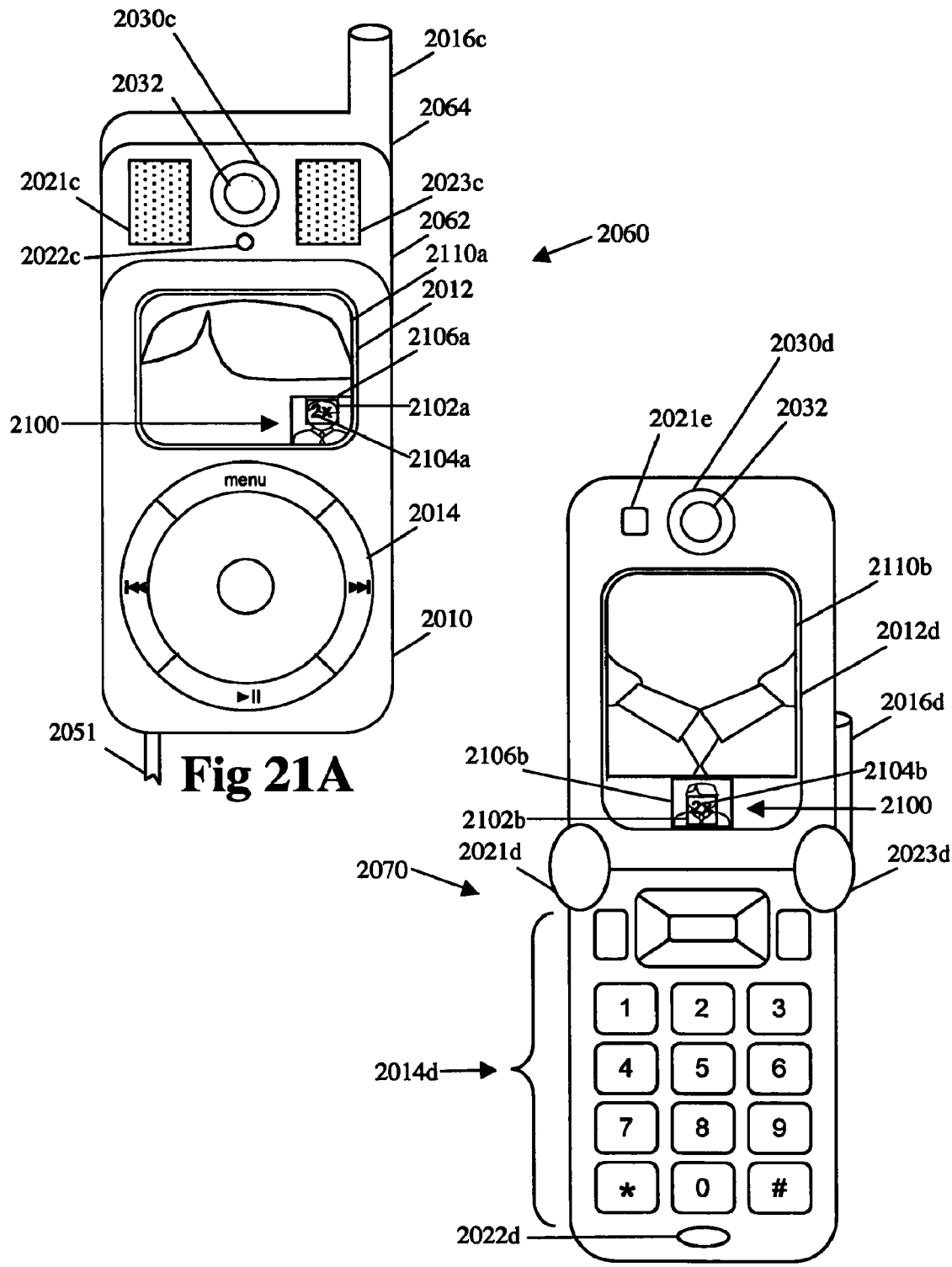

VIDEO TRANSMISSION AND DISPLAY INCLUDING BIT-WISE SUB-SAMPLING VIDEO COMPRESSION

CROSS-REFERENCE TO RELATED APPLICATIONS

This application is a continuation in part of U.S. patent application Ser. No. 09/467,721, filed on Dec. 20, 1999 now U.S. Pat. No. 7,233,619, and entitled "VARIABLE GENERAL PURPOSE COMPRESSION FOR VIDEO IMAGES (ZLN)", which hereby is incorporated by reference.

This application and application Ser. No. 09/467,721 claim priority under 35 U.S.C. §119(e) of U.S. provisional application Ser. No. 60/113,051, filed on Dec. 21, 1998, and entitled "METHODS OF ZERO LOSS (ZL) COMPRESSION AND ENCODING OF GRAYSCALE IMAGES", which hereby is incorporated by reference.

My co-pending U.S. patent application Ser. No. 09/312,922, filed on May 17, 1999, and entitled "SYSTEM FOR TRANSMITTING VIDEO IMAGES OVER A COMPUTER NETWORK TO A REMOTE RECEIVER" is also hereby incorporated by reference.

My U.S. patent application Ser. No. 09/433,978, now U.S. Pat. No. 6,803,931, filed on Nov. 4, 1999, and entitled GRAPHICAL USER INTERFACE INCLUDING ZOOM CONTROL REPRESENTING IMAGE AND MAGNIFICATION OF DISPLAYED IMAGE", is also hereby incorporated by reference. A co-pending divisional application of U.S. Pat. No. 6,803,931, is U.S. patent application Ser. No. 10/890,079, filed on Jul. 13, 2004, published on Dec. 9, 2004 as publication number 20004/0250216, and entitled GRAPHICAL USER INTERFACE INCLUDING ZOOM CONTROL REPRESENTING IMAGE AND MAGNIFICATION OF DISPLAYED IMAGE", and is also hereby incorporated by reference.

My U.S. patent application Ser. No. 09/470,566, now U.S. Pat. No. 7,016,417, filed on Dec. 22, 1999, and entitled GENERAL PURPOSE COMPRESSION FOR VIDEO IMAGES (RHN)", describes a compression method known as the "RHN" method, and is also hereby incorporated by reference.

My co-pending U.S. patent application Ser. No. 09/473,190, filed on Dec. 20, 1999, and entitled "ADDING DOPPLER ENHANCEMENT TO GRAYSCALE COMPRESSION (ZLD)" is also hereby incorporated by reference.

My co-pending U.S. patent application Ser. No. 10/154,775, filed on May 24, 2002, published as US 2003/0005428, and entitled "GLOBAL MEDIA EXCHANGE" is also hereby incorporated by reference.

BACKGROUND

1. Description of Prior Art

In the last few years, there have been tremendous advances in the speed of computer processors and in the availability of bandwidth of worldwide computer networks such as the Internet. These advances have led to a point where businesses and households now commonly have both the computing power and network connectivity necessary to have point-to-point digital communications of audio, rich graphical images, and video. However the transmission of video signals with the full resolution and quality of television is still out of reach. In order to achieve an acceptable level of video quality, the video signal must be compressed significantly without losing either spatial or temporal quality.

2. Field of the Invention

This invention relates to handheld devices for video transmission, including video capture, wired and wireless file transfer and live streaming, and display. Embodiments of the invention relate to data compression, specifically to the compression and decompression of video and still images, and relate to graphical user interfaces for controlling video transmission and display.

A number of different approaches have been taken but each has resulted in less than acceptable results. These approaches and their disadvantages are disclosed by Mark Nelson in a book entitled *The Data Compression Book, Second Edition*, published by M&T Book in 1996. Mark Morrison also discusses the state of the art in a book entitled *The Magic of Image Processing*, published by Sams Publishing in 1993.

Video Signals

Standard video signals are analog in nature. In the United States, television signals contain 525 scan lines of which 480 lines are visible on most televisions. The video signal represents a continuous stream of still images, also known as frames, that are fully scanned, transmitted and displayed at a rate of 30 frames per second. This frame rate is considered full motion.

A television screen has a 4:3 aspect ratio.

When an analog video signal is digitized each of the 480 lines is sampled 640 times, and each sample is represented by a number. Each sample point is called a picture element, or pixel. A two dimensional array is created that is 640 pixels wide and 480 pixels high. This 640×480 pixel array is a still graphical image that is considered to be full frame. The human eye can perceive 16.7 thousand colors. A pixel value comprised of 24 bits can represent each perceivable color. A graphical image made up of 24-bit pixels is considered to be full color. A single, second-long, full frame, full color video requires over 220 millions bits of data.

The transmission of 640×480 pixels×24 bits per pixel times 30 frames requires the transmission of 221,184,000 million bits per second. A T1 Internet connection can transfer up to 1.54 million bits per second. A high-speed (56 Kb) modem can transfer data at a maximum rate of 56 thousand bits per second. The transfer of full motion, full frame, full color digital video over a T1 Internet connection, or 56 Kb modem, will require an effective data compression of over 144:1, or 3949:1, respectively.

A video signal typically will contain some signal noise. In the case where the image is generated based on sampled data, such as an ultrasound machine, there is often noise and artificial spikes in the signal. A video signal recorded on magnetic tape may have fluctuations due the irregularities in the recording media. Florescent or improper lighting may cause a solid background to flicker or appear grainy. Such noise exists in the real world but may reduce the quality of the perceived image and lower the compression ratio that could be achieved by conventional methods.

Basic Run-Length Encoding

An early technique for data compression is run-length encoding where a repeated series of items are replaced with one sample item and a count for the number of times the sample repeats. Prior art shows run-length encoding of both individual bits and bytes. These simple approaches by themselves have failed to achieve the necessary compression ratios.

Variable Length Encoding

In the late 1940s, Claude Shannon at Bell Labs and R. M. Fano at MIT pioneered the field of data compression. Their work resulted in a technique of using variable length codes where codes with low probabilities have more bits, and codes with higher probabilities have fewer bits. This approach requires multiple passes through the data to determine code probability and then to encode the data. This approach also has failed to achieve the necessary compression ratios.

D. A. Huffman disclosed a more efficient approach of variable length encoding known as Huffman coding in a paper entitled "A Method for Construction of Minimum Redundancy Codes," published in 1952. This approach also has failed to achieve the necessary compression ratios.

Arithmetic, Finite Context, and Adaptive Coding

In the 1980s, arithmetic, finite coding, and adaptive coding have provided a slight improvement over the earlier methods. These approaches require extensive computer processing and have failed to achieve the necessary compression ratios.

Dictionary-Based Compression

Dictionary-based compression uses a completely different method to compress data. Variable length strings of symbols are encoded as single tokens. The tokens form an index to a dictionary. In 1977, Abraham Lempel and Jacob Ziv published a paper entitled, "A Universal Algorithm for Sequential Data Compression" in IEEE Transactions on Information Theory, which disclosed a compression technique commonly known as LZ77. The same authors published a 1978 sequel entitled, "Compression of Individual Sequences via Variable-Rate Coding," which disclosed a compression technique commonly known as LZ78 (see U.S. Pat. No. 4,464,650). Terry Welch published an article entitled, "A Technique for High-Performance Data Compression," in the June 1984 issue of IEEE Computer, which disclosed an algorithm commonly known as LZW, which is the basis for the GIF algorithm (see U.S. Pat. Nos. 4,558,302, 4,814,746, and 4,876, 541). In 1989, Stack Electronics implemented a LZ77 based method called QIC-122 (see U.S. Pat. No. 5,532,694, U.S. Pat. No. 5,506,580, and U.S. Pat. No. 5,463,390).

These lossless (method where no data is lost) compression methods can achieve up to 10:1 compression ratios on graphic images typical of a video image. While these dictionary-based algorithms are popular, these approaches require extensive computer processing and have failed to achieve the necessary compression ratios.

JPEG and MPEG

Graphical images have an advantage over conventional computer data files: they can be slightly modified during the compression/decompression cycle without affecting the perceived quality on the part of the viewer. By allowing loss of data, compression ratios of 25:1 have been achieved without major degradation of the perceived image. The Joint Photographic Experts Group (JPEG) has developed a standard for graphical image compression. The JPEG lossy (method where some data is lost) compression algorithm first divides the color image into three color planes and divides each plane into 8 by 8 blocks, and then the algorithm operates in three successive stages:

(a) A mathematical transformation known as Discrete Cosine Transform (DCT) takes a set of points from the spatial domain and transforms them into an identical representation in the frequency domain.

(b) A lossy quantization is performed using a quantization matrix to reduce the precision of the coefficients.

(c) The zero values are encoded in a zig-zag sequence (see Nelson, pp. 341-342).

JPEG can be scaled to perform higher compression ratio by allowing more loss in the quantization stage of the compression. However this loss results in certain blocks of the image being compressed such that areas of the image have a blocky appearance and the edges of the 8 by 8 blocks become apparent because they no longer match the colors of their adjacent blocks. Another disadvantage of JPEG is smearing. The true edges in an image get blurred due to the lossy compression method.

The Moving Pictures Expert Group (MPEG) uses a combination of JPEG based techniques combined with forward and reverse temporal differencing. MPEG compares adjacent frames and, for those blocks that are identical to those in a previous or subsequent frame, only a description of the previous or subsequent identical block is encoded. MPEG suffers from the same blocking and smearing problems as JPEG.

These approaches require extensive computer processing and have failed to achieve the necessary compression ratios without unacceptable loss of image quality and artificially induced distortion.

QuickTime: CinePak, Sorensen, H.263

Apple Computer, Inc. released a component architecture for digital video compression and decompression, named QuickTime. Any number of methods can be encoded into a QuickTime compressor/decompressor (codec). Some popular codec are CinePak, Sorensen, and H.263. CinePak and Sorensen both require extensive computer processing to prepare a digital video sequence for playback in real time; neither can be used for live compression. H.263 compresses in real time but does so by sacrificing image quality resulting in severe blocking and smearing.

Fractal and Wavelet Compression

Extremely high compression ratios are achievable with fractal and wavelet compression algorithms. These approaches require extensive computer processing and generally cannot be completed in real time.

Sub-Sampling

Sub-sampling is the selection of a subset of data from a larger set of data. For example, when every other pixel of every other row of a video image is selected, the resulting image has half the width and half the height. This is image sub-sampling. Other types of sub-sampling include frame sub-sampling, area sub-sampling, and bit-wise sub-sampling.

Image Stretching

If an image is to be enlarged but maintain the same number of pixels per inch, data must be filled in for the new pixels that are added. Various methods of stretching an image and filling in the new pixels to maintain image consistency are known in the art. Some methods known in the art are dithering (using adjacent colors that appear to be blended color), and error diffusion, "nearest neighbor", bilinear and bicubic.

Portable Hand Held Devices: Pen-Based Computers and PDAs

In the early 1990s, a number of pen based computers were developed. These portable computers were characterized by a display screen that could be also used as an input device when touched or stroked with a pen or finger. For example in 1991, NCR developed a "notepad" computer, the NCR 3125. Early pen-based computers ran three operating systems: DOS, Microsoft's Windows for Pen Computing and Go Corp.'s PenPoint. In 1993, Apple developed the Newton Message-Pad, an early personal digital assistant (PDA). Palm developed the Palm Pilot in 1996. Later, in 2002, Handspring released the Treo which runs the Palm OS and features a Qwerty keyboard. In 2000, the Sony Clie, used the Palm OS and could play audio files. Later versions included a built-in camera and could capture and play Apple QuickTime™ video. Compaq (now Hewlett Packard) developed the iPAQ in 2000. The iPAQ and other PocketPCs run a version of Windows CE. Some PocketPC and PDA have wireless communication capabilities.

In 2001, Apple released a music player, called the iPod, featuring a small, internal hard disk drive that could hold over 1000 songs and fit in your pocket. The original iPod has a display, a set of controls, and ports for connecting to a computer, such as a Macintosh or PC, via Firewire, and for connecting to headphones. However, the original iPod did not have a color display, a built-in camera, built-in speakers, built-in microphone or wireless communications.

Portable Hand Held Devices: Cell Phone and Picture Phones

The first cellular telephones had simple LCD displays suitable for displaying only a limited amount of text. More recently, cell phones have been developed which have larger, higher resolution displays that are both grayscale and color. Some cell phones have been equipped with built-in cameras with the ability to save JPEG still photos to internal memory. In April 2002, Samsung introduced a cell phone with a built-in still photo camera and a color display. The Samsung SCH-X590 can store up to 100 photos in its memory and can transfer still photos wirelessly.

Cell phones can be used as wireless modems. Initially they had limited data bandwidth. Next, digital cell phones were developed. By early 2002, bandwidth was typically 60-70 Kbps. Higher bandwidth wireless networks are being developed.

Hand Held Devices are Limited is Size and Weight

Hand held devices are limited in size and weight. Many users are only willing to use a handheld device that weights a few ounces and can fit inside a typical shirt pocket, or even worn on their waist or arm. These size and weight limitation prevent handheld devices from having the electronic circuitry, processors, and batteries found in laptops and other larger computers. These limitations have made it impossible to provide full frame, full motion video display or live transmission on handheld devices.

PDAs, PocketPCs, and Picture Phones are Limited by Battery Life, Processor Speed, and Network Bandwidth The existing, commercially available hand held devices have not been able to support live or streaming video for a number of reasons. Uncompressed full-motion, full frame video requires extremely high bandwidth that is not available to handheld portable devices. In order to reduce the bandwidth, lossy compression such as MPEG has been used to reduce the size of the video stream. While MPEG is effective in desktop computers with broadband connections to the Internet, decoding and displaying MPEG encoded video is very processor intensive. The processors of existing handheld devices are slower or less powerful than those used in desktop computers. If MPEG were used in a handheld device, the processor would quickly drains the battery of most handheld devices. Further, the higher bandwidth wireless communications interfaces would also place a large strain on the already strained batteries. Live video transmission and reception would be even more challenging. For this reason, handheld device have not been able to transmit or receive streaming, or especially, live video.

What is needed is an enhanced handheld device that is capable of receiving streaming and live video. Further a handheld device that could capture and transmit live video would provide live coverage of events that would otherwise not be able to be seen. With handheld video devices that both transmit and receive live video, handheld wireless videoconferencing could become a reality. Also a video compression method that requires significantly reduced processing power and would be less draining on the battery of a handheld device is needed. Additionally since, handheld video display screens which are smaller than typical computer screens, a user of a handheld video receiver needs to be able control the portion of a video be transmitted to allow a smaller, higher quality video to be received and viewed on the handheld screen with dimensions smaller than the original video.

SUMMARY OF THE INVENTION

In accordance with the present invention a handheld device comprises a black and white or color video display screen, speakers or headphones for hearing audio associated with the video display, controls for user input, a memory for storing compressed video data, and a processor for running computer programs which decompress the compressed video data and play the video on the display screen, and the video's audio on speakers and/or headphones. Further, some embodiments of the present invention include a microphone and video camera for inputting audio and video. A plurality of handheld video devices are connected to a network for exchanging video file, streaming video from a pre-recorded video file or live transmission from one device to one or more devices in remote locations. The network connections can be wired or wireless.

One embodiment of the present invention comprises a video camera that can be removably mounted on an iPod-type device to add the video capture capability. Further the separate camera unit could include a microphone or speakers. Further, wireless communications could be added to the separate camera unit or as yet another removable unit.

Further, the present invention includes a method of compression of a video stream comprising steps of sub-sampling a video frame, and run-length encoding the sub-sampled pixel values, whereby the method can be executed in real time, and whereby the compressed representation of pixels saves substantial space on a storage medium and requires substantially less time and bandwidth to be transported over a communications link. The present invention includes a corresponding method for decompressing the encoded data.

Further, the present invention includes a zoom control that is graphically displayed on the display screen and receives input from either the touch screen or the controls of the handheld device. A user may use the zoom control to send remote control commands to a transmitting device to dynamically specify an area to be transmitted. Alternatively, the user may use the zoom control to magnify video that is being played from a file.

OBJECTS AND ADVANTAGES

Accordingly, beside the objects and advantages of the method described above, some additional objects and advantages of the present invention are:
  (a) to provide a handheld device for capturing audio and video which can be transmitted to another video display device.
  (b) to provide a handheld device for displaying video that has been received from a video capture and transmission device.
  (c) to provide a handheld wireless video conferencing system comprising handheld devices which act as both transmitters and receivers connected over a data network.
  (d) to provide an add-on module that will allow an iPod-type device to capture, transmit, or receive video.
  (e) to provide a graphical zoom control on a hand held video display device whereby the user can remotely control the area of the video that is being transmitted in high resolution.
  (f) to provide a graphical zoom control on a hand held video display device whereby the user can magnify a video being displayed.

(g) to provide a method of compressing and decompressing video signals so that the video information can be transported across a digital communications channel in real time.

(h) to provide a method of compressing and decompressing video signals such that compression can be accomplished with software on commercially available computers without the need for additional hardware for either compression or decompression.

(i) to provide a high quality video image without the blocking and smearing defects associated with prior art lossy methods.

(j) to provide a high quality video image that suitable for use in medical applications.

(k) to enhance images by filtering noise or recording artifacts.

(l) to provide a method of compression of video signals such that the compressed representation of the video signals is substantially reduced in size for storage on a storage medium.

(m) to provide a level of encryption so that images are not directly viewable from the data as contained in the transmission.

DRAWING FIGURES

In the drawings, closely related figures have the same number but different alphabetic suffixes.

FIG. 2A to 2H show alternatives for selecting a pixel value for encoding.

FIG. 8A shows examples of variable formats.

FIGS. 11A and 11B show an encryption table and a decryption table.

FIGS. 20A through 20D show various embodiments of handheld video devices.

FIGS. 21A through 21C show handheld video devices comprising graphical zoom controls.

Figure 1:
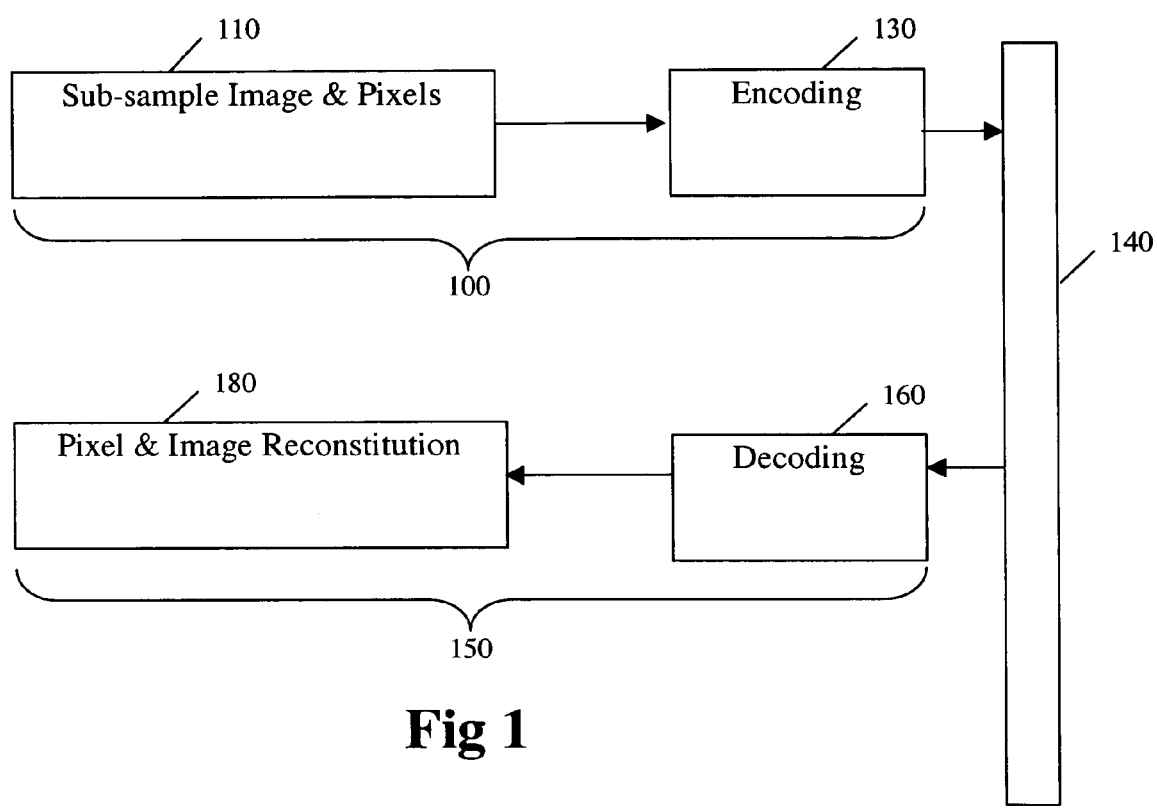
FIG. 1 shows the high level steps of compression and decompression of an image.

| Reference Numerals in Drawings | |
|---|---|
| 100 | compression steps |
| 110 | sub-sampling step |
| 130 | encoding step |
| 140 | encoded data |
| 150 | decompression steps |
| 160 | decoding step |
| 180 | image reconstitution step |
| 200 | 32 bit pixel value |
| 202 | blue channel |
| 204 | green channel |
| 206 | red channel |
| 208 | alpha channel |
| 210 | 24 bit pixel value |
| 212 | blue component |
| 214 | green component |
| 216 | red component |
| 220 | RGB averaging diagram |
| 222 | blue value |
| 224 | green value |
| 226 | red value |
| 228 | averaged value |
| 230 | blue selection diagram |
| 232 | blue instance |
| 234 | green instance |
| 236 | red instance |
| 240 | selected blue value |
| 250 | green selection diagram |
| 260 | selected green value |
| 270 | red selection diagram |
| 280 | selected red value |
| 290 | grayscale pixel |
| 292 | grayscale blue |
| 294 | grayscale green |
| 296 | grayscale red |
| 298 | selected grayscale value |
| 299 | filtered pixel value |
| 300 | N |
| 301 | U |
| 302 | W |
| 310 | pixel bit 7 |
| 312 | pixel bit 6 |
| 314 | pixel bit 5 |
| 316 | pixel bit 4 |
| 318 | pixel bit 3 |
| 320 | pixel bit 2 |
| 322 | pixel bit 1 |
| 324 | pixel bit 0 |
| 325 | 8 bit pixel |
| 330 | 5 bit sample |
| 332 | sample bit 4 |
| 334 | sample bit 3 |
| 336 | sample bit 2 |
| 338 | sample bit 1 |
| 340 | sample bit 0 |
| 350 | 3 low order bits |
| 360 | formatted code |
| 362 | encoded bit 4 |
| 364 | encoded bit 3 |
| 366 | encoded bit 2 |
| 368 | encoded bit 1 |
| 370 | encoded bit 0 |
| 380 | 3 bit count value |
| 400 | encode flowchart |

Reference Numerals in Drawings

| | |
|---|---|
| 402 | encode entry |
| 403 | encode initialization step |
| 404 | get pixel step |
| 405 | get value step |
| 406 | lookup encoded value step |
| 408 | compare previous |
| 410 | increment counter step |
| 412 | check count overflow |
| 414 | new code step |
| 416 | check end of data |
| 418 | set done |
| 420 | counter overflow step |
| 422 | check done |
| 428 | encode exit |
| 430 | image |
| 440 | image width |
| 450 | image height |
| 460 | pixel stream |
| 500 | code byte |
| 510 | flag bit |
| 520 | repeat code |
| 530 | count |
| 550 | data code |
| 560 | wasted bits |
| 565 | data bit 6 |
| 570 | data bit 5 |
| 575 | data bit 4 |
| 580 | data bit 3 |
| 585 | data bit 2 |
| 590 | data bit 1 |
| 595 | data bit 0 |
| 610 | decimal values |
| 620 | first value |
| 622 | second value |
| 624 | third value |
| 626 | fourth value |
| 628 | fifth value |
| 630 | sixth value |
| 632 | seventh value |
| 640 | binary code |
| 650 | first byte |
| 651 | first data |
| 652 | first count |
| 653 | second byte |
| 654 | second data |
| 655 | second count |
| 656 | third byte |
| 657 | third data |
| 658 | third count |
| 740 | RHN binary code |
| 803 | ZL3 format |
| 804 | ZL4 format |
| 805 | ZL5 format |
| 808 | ZL8 format |
| 809 | ZL9 format |
| 812 | ZL12 format |
| 820 | ZL9C format |
| 900 | decode entry |
| 901 | decode initialize step |
| 902 | get code step |
| 908 | decode lookup step |
| 909 | check zero count |
| 910 | place pixel step |
| 914 | reset counter step |
| 916 | check length |
| 918 | decode exit |
| 920 | decode flowchart |
| 1010 | first adjacent pixel |
| 1012 | second adjacent pixel |
| 1014 | first subsequent adjacent pixel |
| 1016 | second subsequent adjacent pixel |
| 1052, 1054, 1056, 1058, 1060 | interpolated pixels |
| 1100 | encryption table |
| 1110 | decryption table |
| 1200 | video frames |
| 1205a | first video frame |
| 1205b | second video frame |
| 1205n | nth video frame |
| 1210 | compressor |
| 1215 | video signal |
| 1220 | series of encoded data |
| 1225 | encoded data buffer |
| 1225a | first encoded data |
| 1225b | second encoded data |
| 1225n | nth encoded data |
| 1230 | received encoded data |
| 1230a | first received encoded data |
| 1230b | second received encoded data |
| 1230n | nth received encoded data |
| 1235 | encoded data stream |
| 1238 | received encoded data |
| 1240 | I/O device |
| 1245 | input encoded data stream |
| 1250 | decompressor |
| 1260 | decoded video frame |
| 1260a | first decoded video frame |
| 1260b | second decoded video frame |
| 1260n | nth decoded video frame |
| 1268 | decoded video frames |
| 1270 | video sequence |
| 1280 | storage medium |
| 1290 | communications channel |
| 1310 | video digitizer |
| 1320 | path 1320 |
| 1330 | video memory |
| 1331 | scan |
| 1332 | pixel index |
| 1340 | path 1340 |
| 1350 | encoding circuit |
| 1360 | path 1360 |
| 1370 | encoded data |
| 1380 | pixel sub-sampler |
| 1380a | 24 to 5 bit sub-sampler |
| 1380b | 24-bit RGB to 5 bit sub-sampler |
| 1380c | 32-bit RGB to 5 bit sub-sampler |
| 1380d | color 9-bit sub-sampler |
| 1380e | YUV sub-sampler |
| 1380f | 36-bit RGB to 24-bit sub-sampler |
| 1380g | 15-bit sub-sampler |
| 1382 | pixel extractor |
| 1383 | value path |
| 1384 | coder |
| 1385 | path 1385 |
| 1390 | data/count |
| 1392 | code index |
| 1395 | path 1395 |
| 1400 | 24-bit to variable bit sub-sampler |
| 1401 | generic 3-bit sub-sampler |
| 1402 | generic 4-bit sub-sampler |
| 1403 | generic 8-bit sub-sampler |
| 1404 | generic 10-bit sub-sampler |
| 1410 | number of bits selector |
| 1420 | number of bits indicator |
| 1430 | 36-bit to variable bit sub-sampler |
| 1440 | 24/36 bit variable bit sub-sampler |
| 1450 | second selector |
| 1460 | selection logic |
| 1510 | decoding circuit |
| 1520 | decoded pixel values |
| 1530 | decoder pixel index |
| 1540 | image memory |
| 1600 | transmitter |
| 1610 | receiver |
| 1615 | setting control path |
| 1620 | frame sub-sampler |
| 1621 | path 1621 |
| 1630 | selected frame |
| 1632 | pixel from frame |
| 1640 | transmitter pixel sub-sampler |
| 1642 | path 1642 |
| 1650 | run length encoder |
| 1660 | settings |
| 1661 | brightness |
| 1662 | contrast |
| 1663 | height |
| 1664 | width |

-continued

| Reference Numerals in Drawings | |
|---|---|
| 1665 | frame rate |
| 1670 | frame selector |
| 1675 | frame select indicator |
| 1680 | number of pixel bits setting |
| 1690 | alternate transmitter |
| 1700 | run-length encoding step |
| 1710 | run-length encoded output |
| 1720 | further lossless compression step |
| 1730 | further lossless compression output |
| 1800 | unstretched frame |
| 1810 | enlarged image |
| 1820 | stretching step |
| 1901a | first video |
| 1901b | first reflected video |
| 1902a | second video |
| 1902b | second reflected video |
| 1910 | network |
| 1910a | wired network |
| 1910b | wireless network |
| 1910c | combined network |
| 1920a | first node |
| 1920b | second node |
| 1920c | third node |
| 1920d | fourth node |
| 1920e | fifth node |
| 1930 | reflector |
| 1940 | point-to-point transmission |
| 1942 | first indirect path |
| 1944 | second indirect path |
| 2010 | first handheld device |
| 2012 | display |
| 2012b | second display |
| 2012d | phone display |
| 2014 | controls |
| 2014d | phone controls |
| 2016 | wireless port |
| 2016b | second wireless port |
| 2016c | integrated wireless port |
| 2016d | cellular port |
| 2020 | headphone |
| 2021 | right speaker |
| 2021b | right built-in speaker |
| 2021c | right integrated speaker |
| 2021d | right phone speaker |
| 2021e | phone earphone |
| 2022 | microphone |
| 2022b | built-in microphone |
| 2022c | integrated microphone |
| 2022d | phone microphone |
| 2023 | left speaker |
| 2023b | left built-in speaker |
| 2023c | left integrated speaker |
| 2023d | left phone speaker |
| 2024 | speaker/microphone cable |
| 2030 | camera |
| 2030b | built-in camera |
| 2030c | integrated camera |
| 2030d | phone camera |
| 2032 | lens |
| 2034 | camera cable |
| 2040 | second handheld device |
| 2050 | wireless connection |
| 2051 | wired connection |
| 2051a | first wired connection |
| 2051b | second wired connection |
| 2052 | video source |
| 2054 | video transmitter |
| 2056 | video storage |
| 2060 | integrated handheld device |
| 2062 | A/V module |
| 2064 | wireless module |
| 2070 | cellular integrated device |
| 2100 | zoom control |
| 2102a | inner region |
| 2102b | second inner region |
| 2102c | third inner region |
| 2104a | magnification factor |

-continued

| Reference Numerals in Drawings | |
|---|---|
| 2104b | second magnification factor |
| 2104c | third magnification factor |
| 2106a | outer region |
| 2106b | second outer region |
| 2106c | second outer region |
| 2110a | video display window |
| 2110b | alternate video display window |

DESCRIPTION OF THE INVENTION

FIG. 1—Compression and Decompression Steps

FIG. 1 illustrates a sequence of compression steps 100 and a sequence of decompression steps 150 of the present invention. The compression steps 100 comprise a sub-sampling step 110 and an encoding step 130. After completion of the compression steps 100, a stream of encoded data 140 is output to either a storage medium or a transmission channel. The decompression steps 150 comprise a decoding step 160 wherein the stream of encoded data 140 is processed and an image reconstitution step 180.

FIGS. 2A to 2H Selecting Pixel Values for Encoding

FIGS. 2A to 2G illustrate alternatives for selecting a pixel value for encoding. The sub-sampling step 110 (FIG. 1) includes sub-sampling of a pixel value to obtain a variable selected number of bits.

Video digitizing hardware typical has the options of storing the pixel values as a 32 bit pixel value 200 or a 24 bit pixel value 210, shown in FIG. 2A and FIG. 2B, respectively. The 32 bit pixel value 200 is composed of a blue channel 202, a green channel 204, a red channel 206, and an alpha channel 208. Each channel contain 8 bits and can represent 256 saturation levels for the particular color channel. For each channel the saturation intensity value of zero represents the fully off state, and the saturation intensity value of "255" represents the fully on state. A common alternative not shown is a sixteen-bit format where the three color channels contain 5 bits each and the alpha channel is a single bit. The present invention anticipates the use of the color channels of 16 bit pixel value is a manner substantially the same as the 32-bit pixel value 200 except the number of bits per channel is 5 instead of 8.

The 24-bit pixel value 210 is composed of a blue component 212, a green component 214, and a red component 216. There is no component for the alpha channel in the 24 bit pixel value 210. Regardless of the structure, the blue channel 202 is equivalent to the blue component 212, the green channel 204 is equivalent to the green component 214, and the red channel 206 is equivalent to the red component 216.

In the present invention, the 32 bit pixel value 200 alternative is preferred due to the consistent alignment of 32 bit values in most computer memories; however for simplicity of illustration the alpha channel 208 will be omitted in FIG. 2C to 2G.

If the video signal is digitized in color, the three color components may have different values. For example in FIG. 2C, a RGB averaging diagram 220 illustrates a blue value 222 of 35 decimal, a green value 224 of 15, and a red value 226 of 10. One alternative is to sub sample from 24 bits to 8 bits by averaging the three color values to obtain an averaged value 228 that, in this example, has the value of 20. (10+15+35)/3=20. This will produce a grayscale image. Alternatively, a color image can be preserved by sampling bits from each color component (see FIG. 8B).

FIG. 2D illustrates another alternative for selecting an 8 bit value in a blue selection diagram 230. In this example, a blue instance 232 has the value of 35, a green instance 234 has the value of 15, and a red instance 236 has the value of 10. In this alternative the blue instance 232 is always selected as a selected blue value 240.

FIG. 2E illustrates another alternative for selecting an 8 bit value in a green selection diagram 250. In this alternative the green instance 234 is always selected as a selected green value 260.

FIG. 2F illustrates another alternative for selecting an 8 bit value in a red selection diagram 270. In this alternative the red instance 236 is always selected as a selected red value 280.

If the video signal being digitized is grayscale, the three color components will have the same values. For example in FIG. 2G, a grayscale pixel 290 comprises a grayscale blue 292 with a value of decimal 40, a grayscale green 294 with a value of 40, and a grayscale red with a value of 40. Because the values are all the same, it makes no difference which grayscale color component is selected, a selected grayscale value 298 will have the value of 40 in this example.

The preferred embodiment of this invention uses the low order byte of the pixel value, which is typically the blue component as shown in FIG. 2D.

FIG. 2H illustrates a filtered pixel value 299 of 8 bits that may be selected by one of the alternatives described above. In these examples, the filtered pixel value 299 is equivalent to items referenced by numerals 228, 240, 260, 280, or 298. This reduction of the 32 bit pixel value 200 or the 24 bit pixel value 210 contributes a reduction in data size of 4:1 or 3:1, respectively. This reduction recognizes that for some images, such as medical images or grayscale images, no relevant information is lost.

For additional compression, the filtered pixel value 299 can variably select any number of bits. For example, selection of the most significant four bits instead of all eight bits filters noise that may show up in the low order bits may be very suitable for an image such as one produced by an ultrasound medical device. An example of this is shown by ZL4 804 in FIG. 8A.

Figure 3A:
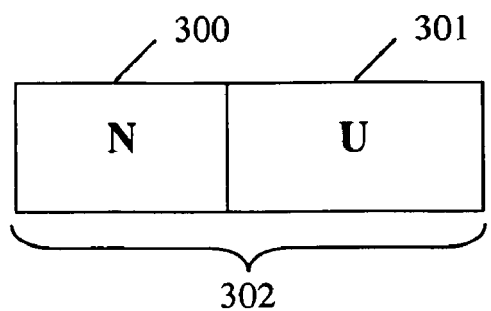
FIG. 3A shows the variable encoding format.
Figure 3B:
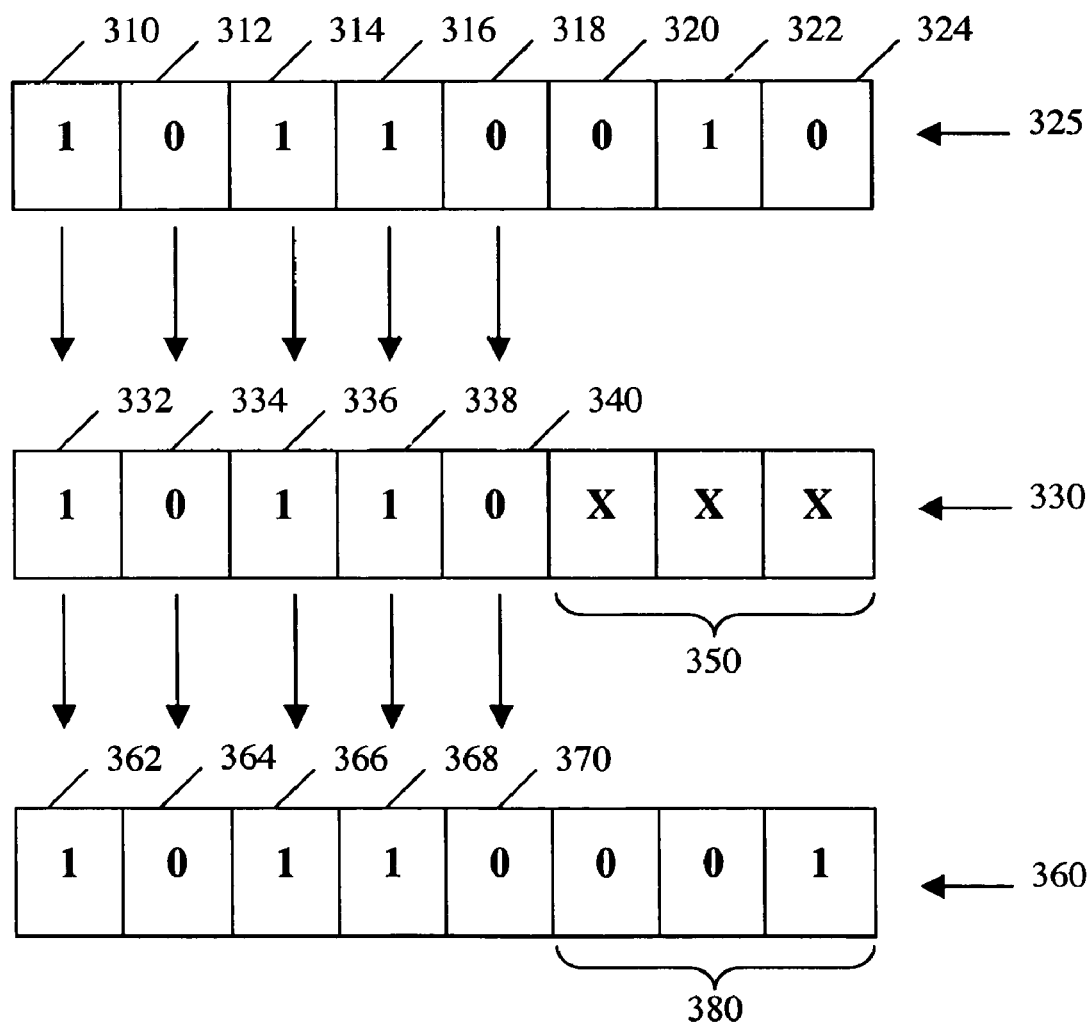
FIG. 3B shows an example of a code where N is 5 bits wide and U is 3 bits wide.

FIGS. 3A and 3B—Encoding Formats

Speed of compression and decompression may be enhanced if the algorithms fit into computer memory native storage elements such as 8 bit bytes, 16 bit words, or 32 bit double words, or some other size for which the computer architecture is optimized.

A grayscale image may be stored at a higher bit level than the actual values require. This may occur when an image is generated by an imaging technology such as radar, ultrasound, x-ray, magnetic resonance, or similar electronic technology. For example an ultrasound machine may only produce 16 levels of grayscale, requiring 4 bits of data per pixel, but the image digitizing may be performed at 8 to 12 bits per pixel. In this example, the low order bits (4 to 8) respectively provide no significant image data.

In the present invention, a fast and efficient compression and encoding method is implemented by using unused bits to store a repeat count for repeated values.

The most significant N bits of the pixel value are selected where N is the number of significant bits (determined by data analysis or by user selection). If N is less than W, where W is a native machine data type such as 8 bit byte, 16 bit word, or 32 bit double word or some other size for which the computer architecture is optimized, then W-N equals the number of unneeded bits, U. A repeat count, C, can contain a value from 1 to CMAX where CMA is 2 to the power of U. For example, if U equals 4, C can be a number from 1 to 16. In practice the maximum value will be encoded as a zero because the high order bit is truncated. In the example, decimal 16 has a binary value "10000" will be stored as "0000".

For example, when W is 8, value pairs for N and U could include without limitation (2,6), (3,5), (4,4), (5,3), and (6,2). When W is 16, value pairs for N and U could include without limitation (2,14), (3,13), (4,12), (5,11), (6,10), (7,9), (8, 8), (9, 7), (10,6), (11, 5), (12, 4), (13, 3), and (14, 2). When W is 32, value pairs for N and U could include without limitation all combinations of values pairs for N and U where N+U equals 32 and N>1 and U>1. When W is not a multiple of 8, value pairs for N and U could include without limitation all combinations of values pairs for N and U where N+U equals W and N>1 and U>1.

FIG. 3A shows the encoded format where N 300 represent the N most significant bits of the pixel value 299, U 301 represents the bits that are not used for the data and are used for the repeat count, and W 302 where W is the width of the encoded data and equal to sum of N and U FIG. 3B illustrates bit sub-sampling where N's 300 bit width is 5, U's 301 bit width is 3, and W 302 is 8. The high order 5 bits 310-318 of an 8 bit pixel 325 are extracted to form a five bit sample 330. The lower 3 bits of 330 are ignored bits 350. In the formatted code 360, the ignored bits 350 are replaced with the repeat count value 380.

Encoding

The most significant N bits of each pixel are selected from the image to obtain value V.

In the encryption embodiment of this invention V may be used to select an encoded value, E, from the encoding table. E is also a N-bit value. The number of elements in the encode table 1100 (FIG. 11) is 2 to the Nth power.

In the other embodiments of this invention V is used as E.

E is saved as the prior value, P. For each subsequent pixel, the encoded value, E, is obtained and compared to the prior value, P. If the prior value, P, is the same as E, then a repeat counter, C, is incremented; otherwise the accumulated repeat count, C, for the prior value, P, is merged with P and placed in an array A that implements the encoded data 140 (FIG. 1) buffer. For example, if W is 8 and N is 4 and C is 10, U is 4, CMAX is 16, and ((P<<U)||C) is the merged value. If the repeat count, C, is greater CMAX, then CMAX is merged with P ((P<<U)|CMAX) and placed in the encoded data 140 (FIG. 1) buffer, A. CMAX is subtracted from C and merged values are placed in A until C is less than CMAX. All pixels are processed in this manner until the final value is compressed and encoded. The length, L, of the encoded data 140 (FIG. 1) is also placed in the encoded data 140 buffer.

Figure 4A:
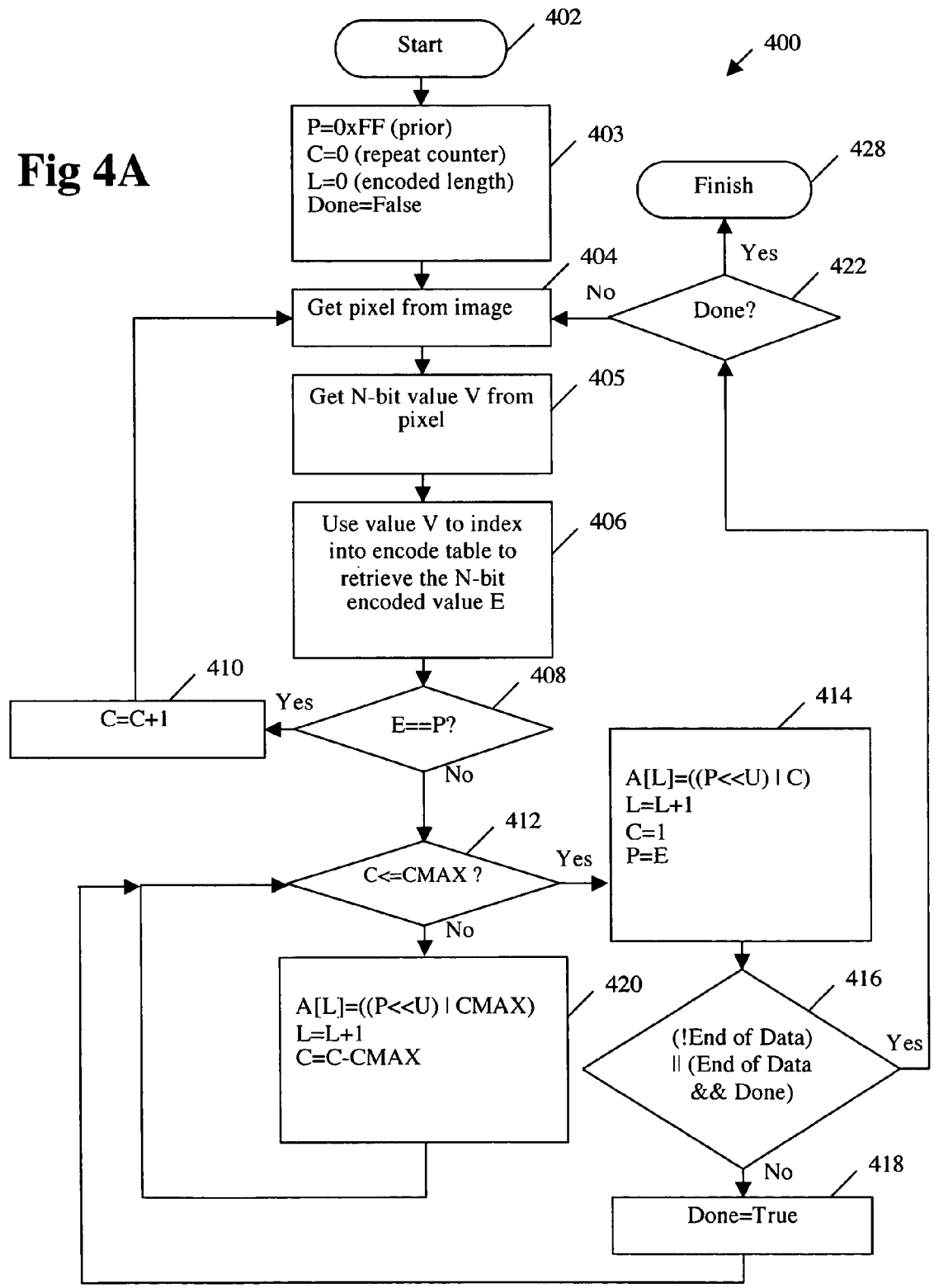
FIG. 4A shows the flowchart for the compression method.

FIG. 4A—Encode Flowchart

FIG. 4A illustrates the encode flowchart 400 which represents the details of the encryption embodiment of the encoding step 130 (FIG. 1) for the present invention.

The encoding begins at an encode entry 402. In an encode initialization step 403, a prior value P is set to a known value, preferably decimal "255" or hexadecimal 0xFF, a repeat counter C is set to zero, an encoded length L is set to 0, and a completion flag "Done" is set to a logical value of false. Next, a get pixel step 404 obtains a pixel from the image being encoded. At a get value step 405, a value V is set to the N bit filtered pixel value 299 as derived from the pixel using one of the methods shown in FIG. 2C to 2G, preferably the fastest as explained above, and extracting the N most significant bits. At a lookup encoded value step 406, an encoded value E is set to the value of one of the codes 1105 (FIG. 11A) of the encode table 1100 as indexed by V. (In the non-encrypted embodiment of this invention, step 406 is bypassed because V is used as E) Next, a compare previous 408 decision is made by comparing the values of E and P. If the values are the same, an increment counter step 410 is executed and flow continues to the get pixel step 404 that obtains the next pixel from the image.

If the encode value E does not match the prior value P, then a check count overflow 412 decision is made. If the counter C is less than or equal to CMAX, then a new code step 414 is executed, otherwise a counter overflow step 420 is executed.

At step 414, the counter C is masked and bit-wise OR-ed with P shifted left by U bit positions and is placed in the A at the next available location as indexed by the encoded length L. Then, continuing inside flowchart step 414, L is incremented, the repeat count C is set to 1 and the prior value P is set to E. After step 414, a "check end of data" decision is made by checking to see if there are any more pixels in the image, and, if not, if the last value has been processed. Because this method utilizes a read ahead technique step 414 must be executed one more time after the end of data is reached to process the last run-length. If there is more data in the image, flow continues to a check of the completion flag "Done" at step 422. If the check indicates that the process is not completed, flow continues to step 404.

If the end of data is reached but the completion flag "Done" is still false, flow continues to a set done step 418. At step 418, the completion flag "Done" is set to logical true, and flow continues to decision 412 where the last run-length will be output and flow will eventually exit through step 414, decision 416, decision 422, and then terminate at encode exit 428.

It is possible for the repeat count C to become larger than CMAX requiring more bits than allocated by this method. This situation is handled by making the check count overflow 412 decision and executing the counter overflow step 420. At step 420, the counter C is masked and bit-wise OR-ed with P shifted left by U bit positions and is placed in the A at the next available location as indexed by the encoded length L. Then, continuing inside flowchart step 414, L is incremented, and the repeat count C is decrement by CMAX. After step 420, flow continues to the check count overflow 412 decision. Thus when the encode value E repeats more than CMAX times, multiple sets of repeat counts and encoded values are output to the encoded data 140 buffer.

This entire process is repeated for each image or video frame selected during optional image sub-sampling (see 110 in FIG. 1) and the encoded length L is transmitted with the encoded data associated with each frame. The encoded length varies from frame to frame depending on the content of the image being encoded.

Figure 4B:
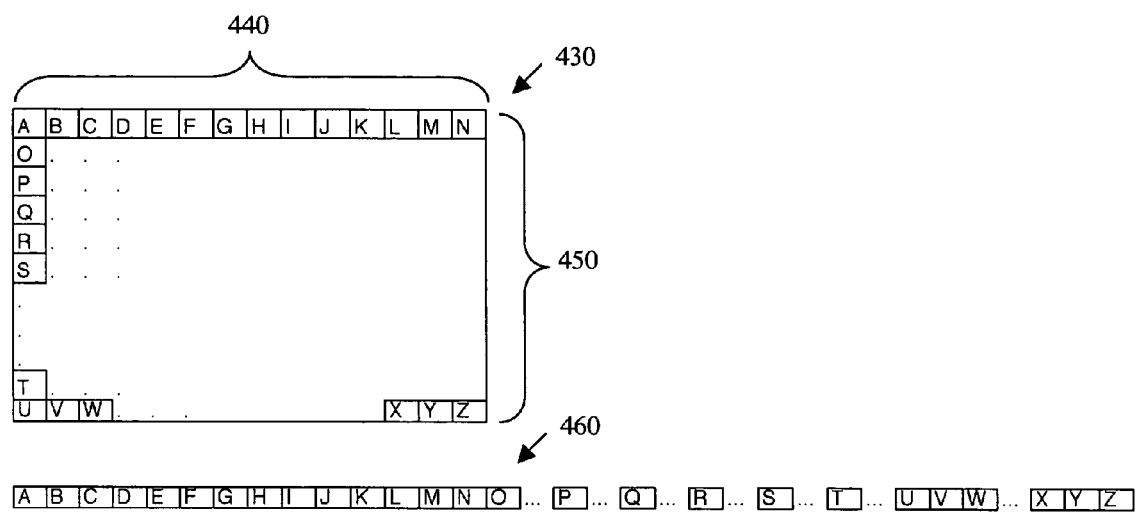
FIG. 4B shows an image and a corresponding stream of pixels.

FIG. 4B—Image and Pixel Stream

FIG. 4B illustrates an image and its corresponding stream of pixels. A rectangular image 430 is composed of rows and columns of pixels. The image 430 has a width 440 and a height 450, both measured in pixels. In this illustrative embodiment, pixels in a row are accessed from left to right. Rows are accessed from top to bottom. Some pixels in the image are labeled from A to Z. Pixel A is the first pixel and pixel Z is the last pixel. Scanning left to right and top to bottom will produce a pixel stream 460. In the pixel stream 460, pixels A and B are adjacent. Also pixels N and O are adjacent even though they appear on different rows in the image. If adjacent pixels have the same code the process in FIG. 4A will consider them in the same run.

Because the video signal being digitized is analog there will be some loss of information in the analog to digital conversion. The video digitizing hardware can be configured to sample the analog data into the image 430 with almost any width 440 and any height 450. The present invention achieves most of its effective compression by sub-sampling the data image with the width 440 value less than the conventional 640 and the height 450 value less than the convention 480. In a preferred embodiment of the invention, for use in a medical application with T1 Internet transmission bandwidth, image dimensions are sub-sampled at 320 by 240. However an image dimension sub-sampling resolution of 80 by 60 may be suitable for some video application.

Figure 5A:
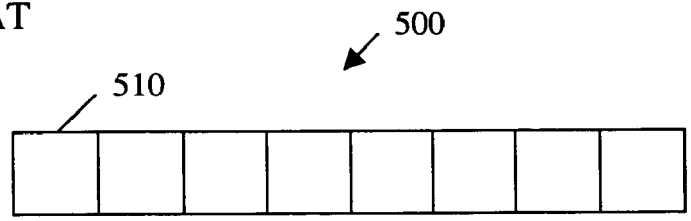
FIG. 5A to 5C shows the formats for the run-length encoding of the RHN method.
Figure 5B:
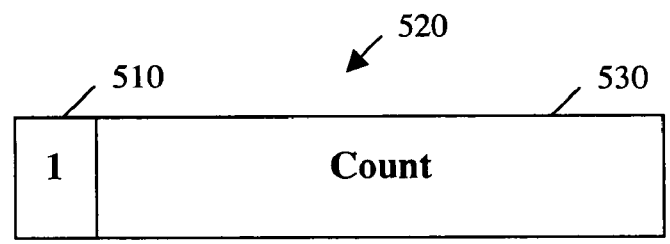
Figure 5C:
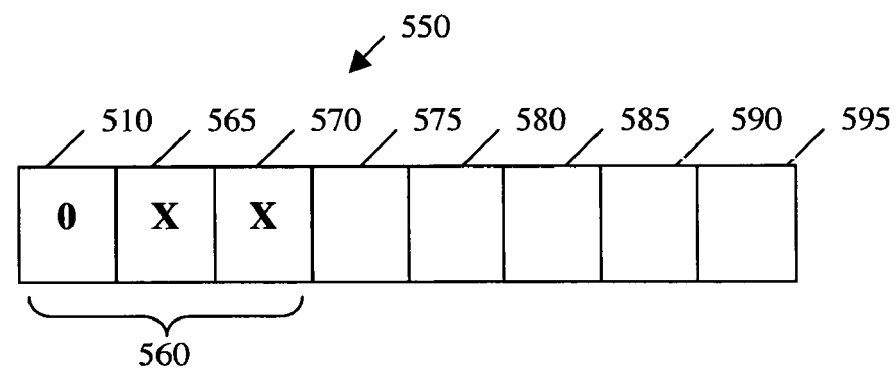

FIGS. 5A to 5C—Run-Length Encoding Formats of the RHN Method

FIGS. 5A to 5C show use of a different structure than the present invention. FIGS. 5A to 5C show the formats for the run-length encoding of RHN. In FIG. 5A, a code byte 500, with its high order bit designated as a flag bit 510.

FIG. 5B shows a repeat code 520 comprising a Boolean value one in its flag bit 510 and a 7 bit count 530 in the remaining 7 low order bits. The seven bit count 530 can represent 128 values with a zero representing "128" and 1 through 127 being their own value.

FIG. 5C shows a data code 550 comprising:
1. a Boolean value zero in its flag bit 510
2. two unused data bits: data bit 6 reference by 565 and data bit 5 reference by 570, and
3. five bits, data bits 4 to 0, reference by 575, 580, 585, 590, and 595, respectively.

FIG. 5C shows that in every byte of the RHN data code 550 two bits are unused and one bit is used for the flag bit, so that only five of the eight bits are used for data. The remaining three bits are wasted bits 560. The present invention uses a different structure by placing the repeat count in bits that the RHN format would not have used for data (U). The corresponding ZLN format, ZL5 (where N is 5, U is 3, and W is 8), always uses five bits for data and the remaining 3 bits for the repeat count. In practice, repeat counts are small and often can fit in 3 bits, so this embodiment of the present invention will result in superior compression performance over the RHN method.

In addition, the present invention provides for a larger count when the bit filtering is larger. For example, the alternate ZLN format where each byte contains 4 data bits, ZL4 (where N is 4 and U is 4), allows for a four bits of repeat count. For example, in practice, ZL4 is superior to RHN on a typical ultrasound image containing 16 shades of gray.

Figure 6:
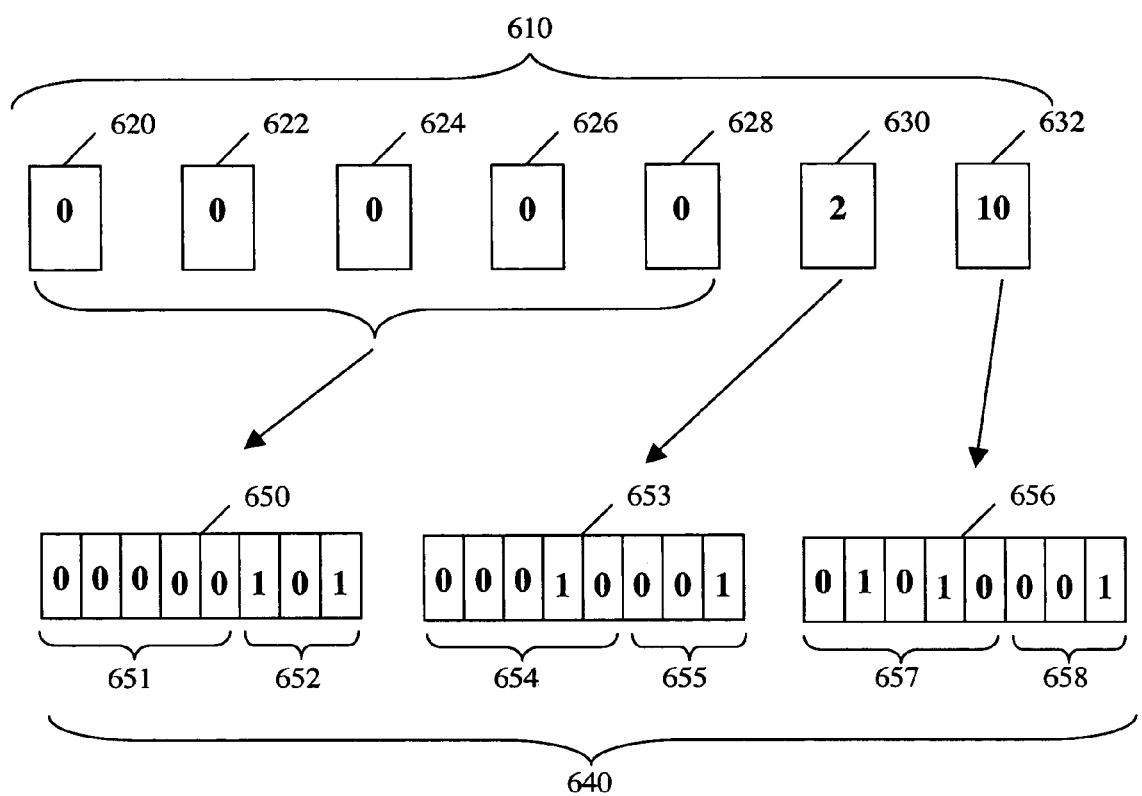
FIG. 6 shows a series of codes and the resulting encoded stream.

FIG. 6—Encoded Data Stream

FIG. 6 shows a series of exemplary decimal values 610 comprising a first value 620 equal to decimal 0, a second value 622 equal to 0, a third value 624 equal to 0, a fourth value 626 equal to 0, a fifth value 628 equal to 0, a sixth value 630 equal to 2, and a seventh value 632 equal to 10. The value of zero is merely exemplary and could be any binary value. After the encoding step 130 (FIG. 1), the corresponding encoded data 140 (FIG. 1) would be compressed down to three bytes of binary code 640 comprising a first byte 650, a second byte 653, and a third byte 656 each containing a merged value and count, (651, 652), (654, 655), and (657, 658), respectively. The first data 651 has a binary value of "00000" which equals the exemplary repeated decimal value. The first count 652 has a binary value "101" which equals decimal five representing the run-length of the repeating value in the first five of the decimal values 610. The second data 654 has a binary value of "00010" which equals the non-repeated decimal value two. The second count 655 has a value of 1. The third data 657 has a binary value of "01010" which equals the non-repeated decimal value ten. The third count 658 has a value of 1.

Figure 7:
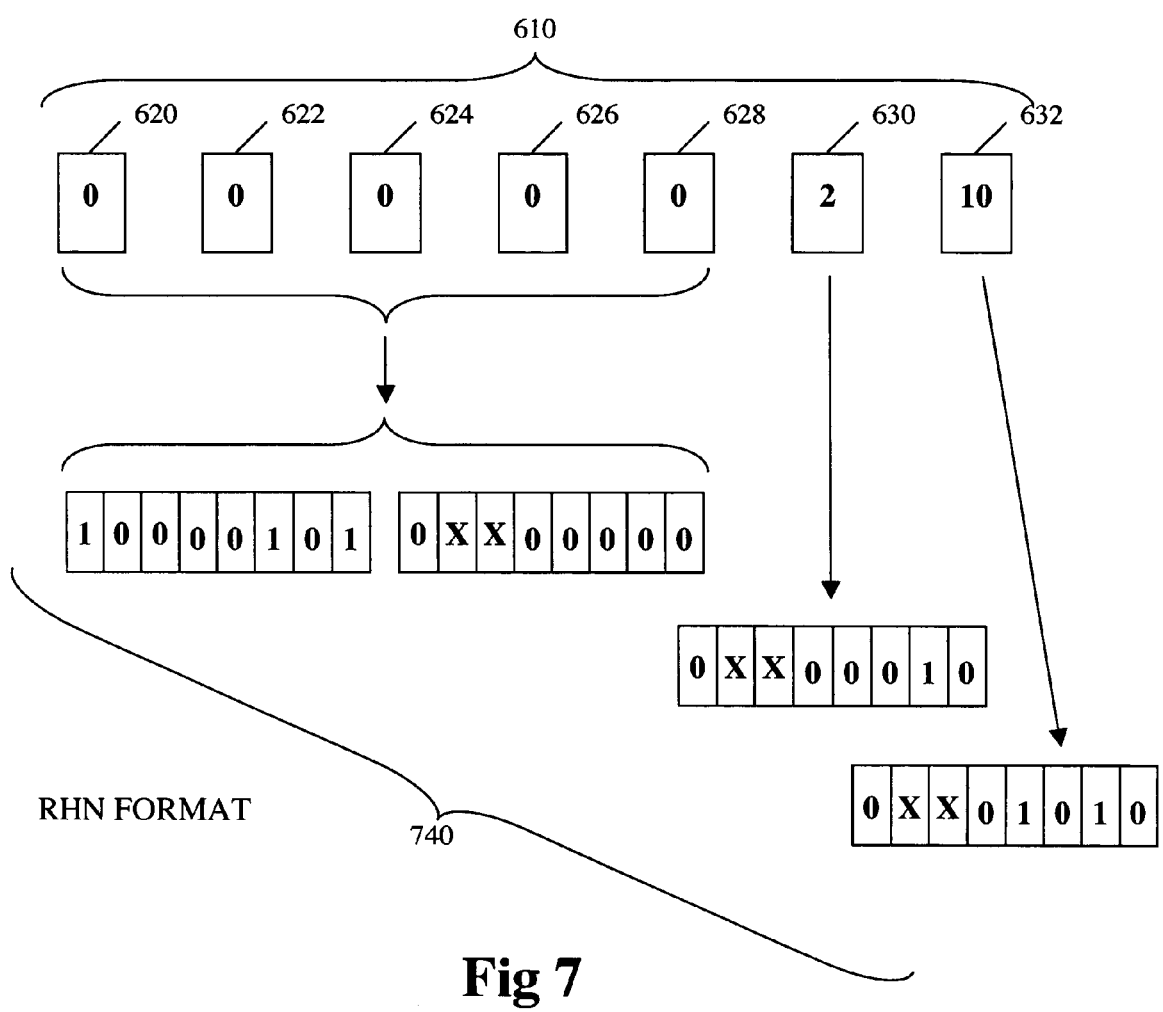
FIG. 7 shows a series of codes and the resulting encoded stream of the RHN method.

FIG. 7—RHN Codes and Encoded Stream

FIG. 7 shows the same series of decimal values 610 (FIG. 6) comprising the first value 620 equal to decimal 0, the second value 622 equal to 0, the third value 624 equal to 0, the fourth value 626 equal to 0, the fifth value 728 equal to 0, the sixth value 730 equal to 2, and the seventh value 732 equal to 10. After encoding by RHN, the corresponding encoded data 140 (FIG. 1) would be compressed down to four bytes of RHN binary code 740.

The embodiment of the present invention shown in FIG. 6 only requires three bytes to encode the same data. In this example, the present invention is 25% better than the RHN format.

Figure 8B:
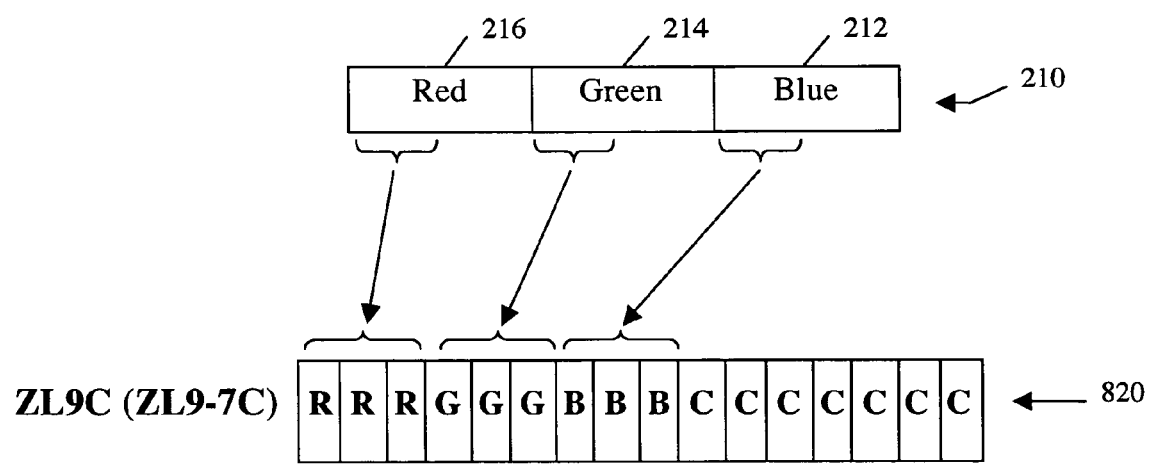
FIG. 8B shows a format that preserves 9 bits of color.

FIGS. 8A and 8B—ZLN Formats

The ZLN method of the present invention provides for variable formats. The values of N 300, U 301, and W 302 can be dynamically changed between frames. For ease of communication a format is named with the prefix "ZL" and a digit representing the value of N. For example, "ZL5" refers to a format where bit width of N is equal to 5. There are multiple values of U depending of the W. To also specify the bit width of U a hyphen and a number can be appended. For example, "ZL5-13" represents a format where N=5 and U=13. "ZL5-3" is a common format and may be imprecisely referred to as "ZL5."

FIG. 8A shows a number of formats with adjacent labels: ZL3 803, ZL4 804, ZL5 805, ZL8 808, ZL9 809, and ZL12 812. Data bits are represented by "D," and count bits are represented by "C".

FIG. 8B shows how the most significant 3 bits of each color component (216, 214, and 212 of FIG. 2B) are extracted and formatted in ZL9-7C format (the "C" append indicates that the color is preserved). With three red bits represented by "R", three green bits represented "G" and three blue bits represented by "B".

Decoding

To decode the compressed array, the decoder has a decode table that corresponds with the encode table. For W*4 bit color pixels, the decode table contains the appropriate alpha, red, green, and blue values. For W*3 bit color pixels, the alpha value is not used. The compressed array is processed W bits at a time as X. The repeat count, C, is extracted from X by masking off the data value (C=X & (((2N)−1)<<U)). The encoded value, E, is extracted from X by masking off the count (E=X&((2U)−1)). The encoded value, E maybe used to index into the decryption. The decoded pixels are placed in a reconstructed image and repeated C times. Each element of the compressed array, A, is processed until its entire length, L, has been processed.

Figure 9:
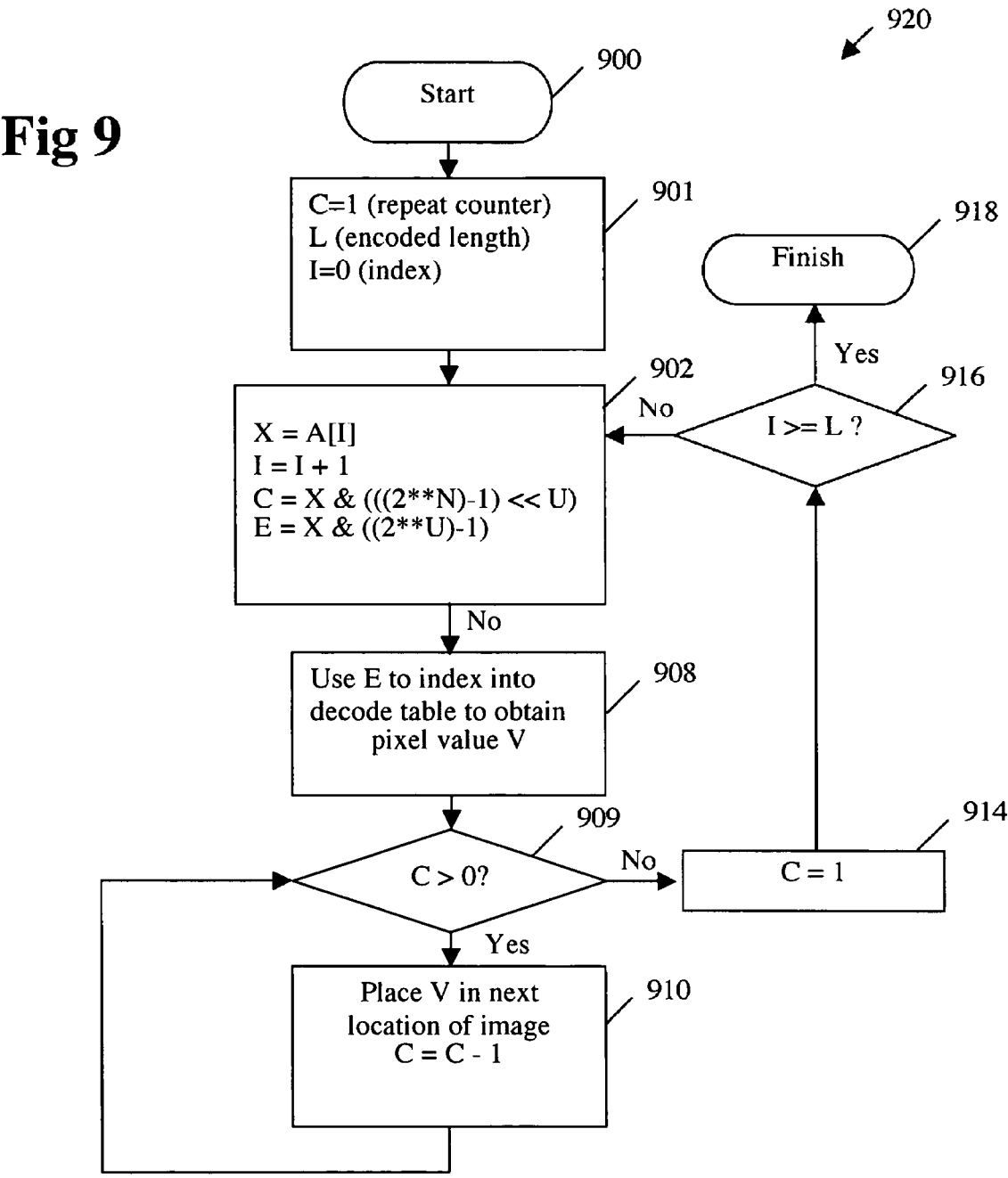
FIG. 9 shows the flow chart for the decompression method.

FIG. 9—Decode Flowchart

FIG. 9 illustrates the decode flowchart 920 which presents the details of the decryption embodiment of the decode step 160 (FIG. 1) and the image reconstitution step 180 (FIG. 1).

The decoding being at a decode entry 900. In a "decode initialization" step 901, a repeat counter C is set to one, an encoded length L is set to the value obtained with the encoded data 140 (FIG. 1), and an index I is set to 0. Next, a "get code" step 902 obtains a signed byte X from the encoded data 140 (FIG. 1) array A. The index I is incremented. The count (for example the 3-bit count 380 as shown in FIG. 3B) is extracted from X by masking off the data bits and placed in the repeat counter C (C=X&((2N)−1<<U). The value of E is extracted from X by masking off the count bits (E=X & (2U)−1). In practice, the count mask and value mask can be pre-computed with the following two lines of code in the C programming language:

valueMask=−1<<U;
countMask=~valueMask;

In this illustrative decryption embodiment of the present invention, flow goes to a "decode lookup" step 908 where the value of E is used to index into the decode table 1110 (FIG. 11) to obtain a pixel value V. In the other embodiments where E is not encrypted, E is used as V and step 908 is bypassed. Flow continues to a "check zero count" 909 decision.

The 909 decision always fails the first time ensuring that a place pixel step 910 is executed. The place pixel step 910 places the pixel value V in the next location of the decompressed image and decrements the repeat counter C and returns to the 909 decision. The pixel value V is placed repeatedly until C decrements to zero. Then the 909 decision branches flow to a "reset counter" step 914. At step 914 the repeat counter is reset to 1.

Flow continues to the "check length" 916 decision where the index I is compared to the encoded length L to determine if there are more codes to be processed. If I is less than L flow returns to step 902, otherwise the decode process terminates at a "decode exit" 918.

The entire decode process is repeated for each encoded frame image.

Figure 10:
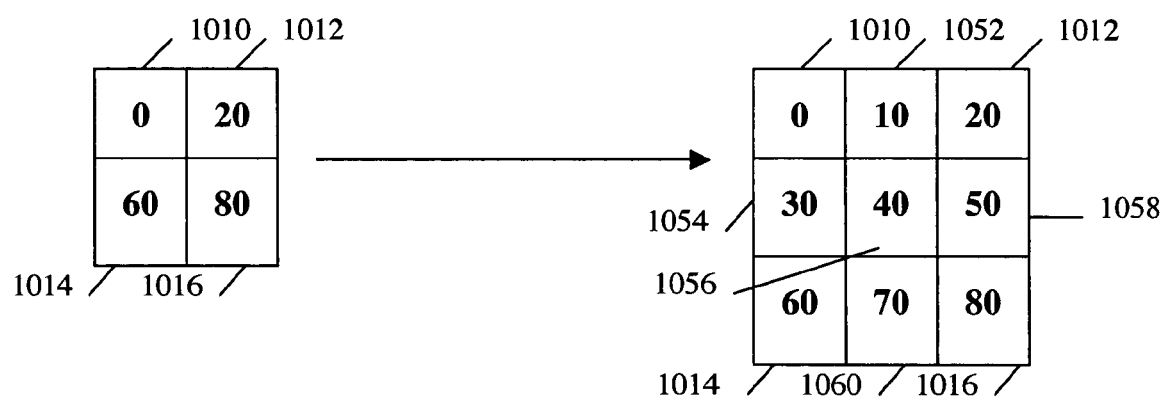
FIG. 10 shows image stretching by interpolation.

FIG. 10—Interpolation

FIG. 10 illustrates interpolation when two adjacent pixels 1010 and 1012 and two subsequent row adjacent pixels 1014 and 1016 are stretched to insert a new row and column of pixels.

Pixels 1052, 1054, 1056, 1058 and 1060 are inserted due to the enlargement of the image. Their values are calculated by averaging the values of the two pixels above and below or to the left or the right of the new pixel. A preferred sequence is calculation of:

1. 1052 between 1010 and 1012
2. 1054 between 1010 and 1014
3. 1058 between 1012 and 1016
4. 1056 between 1054 and 1058

Pixel 1060 can be calculated on the interpolation for the subsequent row.

FIG. 11—Encryption

By using corresponding encoding and decoding tables the data can be encrypted and decrypted without using actual values. Encryption provides a level of security for the encoded data 140 while in storage or transit.

FIG. 11 shows an example of an encryption table 1100, where N is 3 and W is 8, and a decryption table 1110, where N is 3 and U is 5.

The encode table 1100 is 2 the power of N in length. If the target color image format is W*4 bit color, then the decode table 1110 has W bits for alpha, red, green, and blue each, respectively. If the target color image format is W*3 bit color, then the alpha value is not used. If the image is W bit grayscale then only the grayscale value is used to create the decompressed and decoded image.

The corresponding table elements are mapped to each other. For example, 0 could encode to 22 as long as the $22^{nd}$ element of the decode table returns (0xff<<24|0<<16|0<<8|0).

When these versions of the tables are used, the encode and decode processes and their speed of execution are substantially the same but the encoded data 140 (FIG. 1) becomes a cipher and has a higher level of security. It should be recognized by one with ordinarily skill in the art that there are other embodiments of the present invention with different encryption/decryption table rearrangements.

FIGS. 12A Through 12D—Compression and Decompression Devices

Figure 12A:
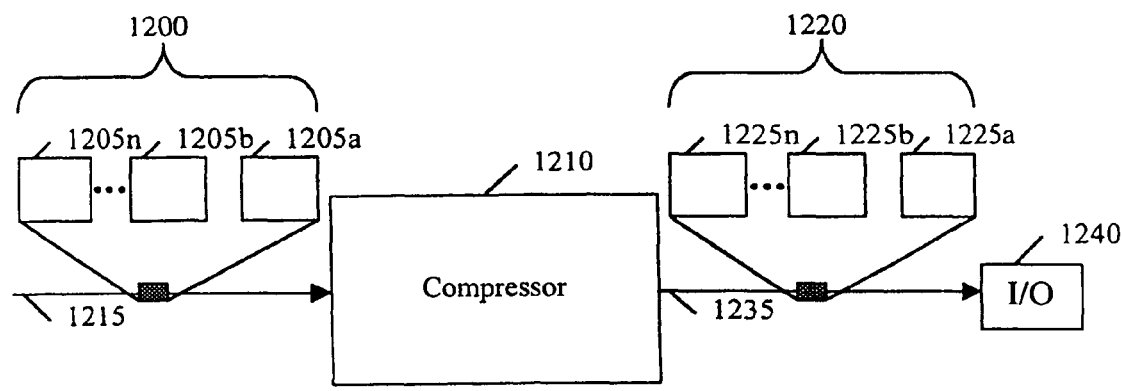
FIGS. 12A and 12B show machines for compressing and decompressing, respectively.
Figure 12B:
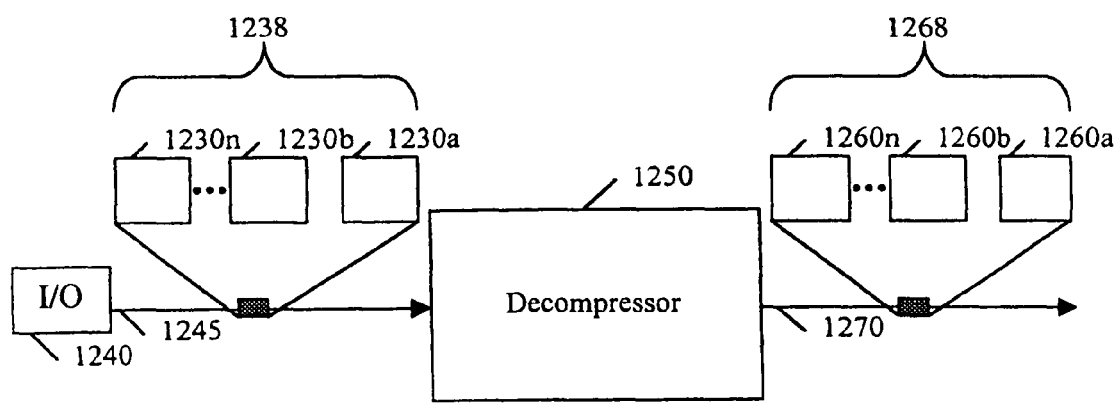

FIGS. 12A and 12B show devices for compressing and decompressing, respectively, a stream video frames.

FIG. 12A shows a video signal 1215 being compressed and encoded by a compressor 1210 to form an encoded data stream 1235, which is sent to an I/O device 1240. The video signal 1215 comprises a series of video frames 1200, shown as first video frame 1205*a*, second video frame 1205*b*, . . . through nth video frame 1205*n*. The encoded data stream 1235 comprises a series of encoded data 1220, shown as first encoded data 1225*a*, second encoded data 1225*b*, . . . , through nth encoded data 1225*n*.

FIG. 12B shows an input encoded data stream 1245 being received from an I/O device 1240, and then, decoded and decompressed by a decompressor 1250 to form a video sequence 1270. The input encoded data stream 1245 comprises received encoded data 1238, shown as first received encoded data 1230*a*, second received encoded data 1230*b*, . . . , through nth received encoded data 1230*n*. The video sequence 1270 comprises a series of decoded video frames 1268, shown as first decoded video frame 1260*a*, second decoded video frame 1260*b*, . . . , through nth decoded video frame 1260*n*.

Figure 12C:
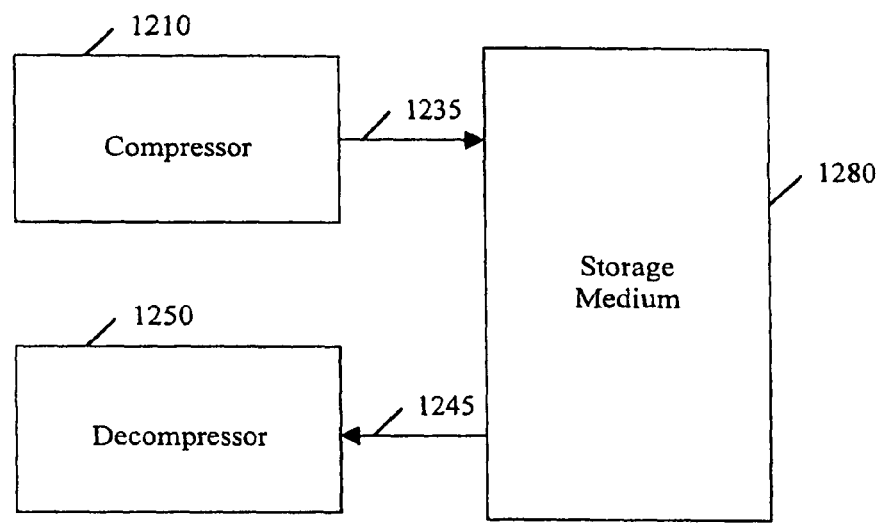
FIG. 12C shows a compressor and decompressor connected to a storage medium

FIG. 12C shows an embodiment where the I/O device 1240 of FIGS. 12A and 12B is a storage medium 1280. The encoded data stream 1235 from the compressor 1210 is stored in the storage medium 1280. The storage medium 1280 provides the input encoded data stream 1245 as input to the decompressor 1250.

Figure 12D:
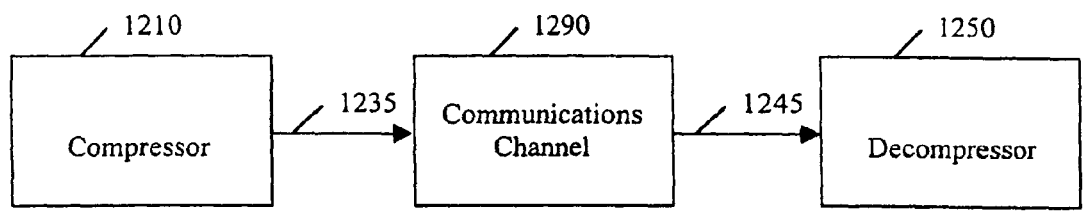
FIG. 12D shows a compressor and decompressor connected to a communications channel.

FIG. 12D shows an embodiment where the I/O device 1240 of FIGS. 12A and 12B is a communications channel 1290. The encoded data stream 1235 from the compressor 1210 is transmitted over the communications channel 1290. The communications channel 1290 provides the input encoded data stream 1245 as input to the decompressor 1250.

Figure 13A:
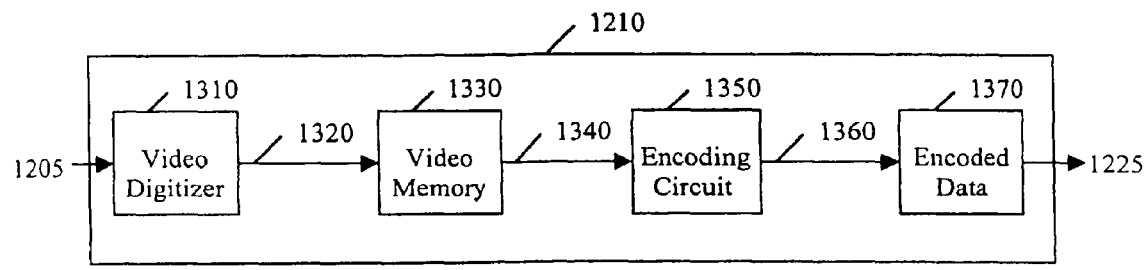
FIG. 13A shows elements of a compressor.

FIGS. 13A Through 13J—Compressor Details, Encoding Circuit, and Bitwise Pixel Sub-Samplers FIG. 13A shows details of an embodiment of the compressor 1210, which comprises a video digitizer 1310, a video memory 1330, an encoding circuit 1350, and encoded data 1370. Each video frame 1205 in the series of video frames 1200 is digitized by the video digitizer 1310 and stored along path 1320 in the video memory 1330. The encoding circuit 1350 access the digitized video frame via path 1340 and outputs the encoded data 1370 along path 1360. The encoded data 1225 corresponding to each video frame 1205 is then output from the compressor 1210.

Figure 13B:
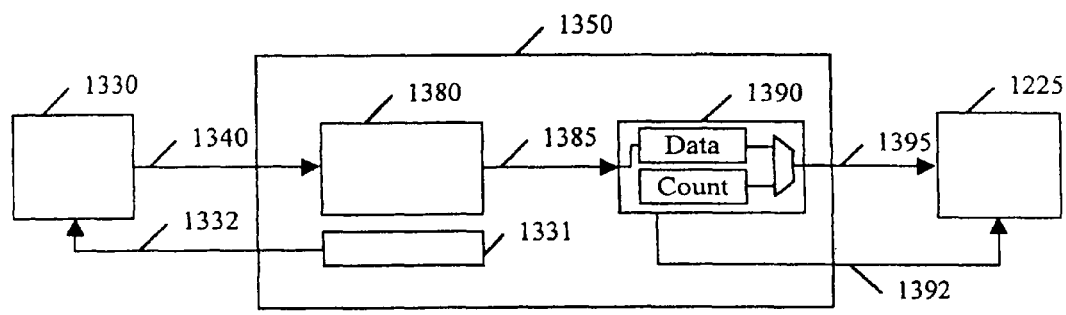
FIG. 13B shows an embodiment of an encoding circuit.

FIG. 13B shows further details of an embodiment of the encoding circuit 1350. A pixel sub-sampler 1380 scans each pixel from the digitized video frame in the video memory 1330. A pixel index 1332 is used to drive a scan 1331 signal to select each pixel from the video memory, in a predetermined sequence. A novel aspect of the present invention is that the compression method can be accomplished with a single scan of the video memory for each frame. The pixel sub-sampler 1380 selects a predetermined number of bits from each pixel and outputs the data value along path 1385. Alternatively, the pixel sub-sampler 1380 encodes the sub-sampled data by using a lookup table similar to FIG. 11A. Different pixel sub-samplers 1380 will be discussed in reference to FIGS. 13C through 13J. The data/count 1390 unit increments the count each time the output of the pixel sub-sampler 1380 is the same; otherwise, when the output of the pixel sub-sampler 1380 is different (or when the counter reaches the maximum count value, the data and count are combined as a code and output along path 1395 to the encoded data 1225 for the frame currently in the video memory 1330. The location of the code in the encoded data 1225 is selected by the code index 1392 signal.

Figure 13C:
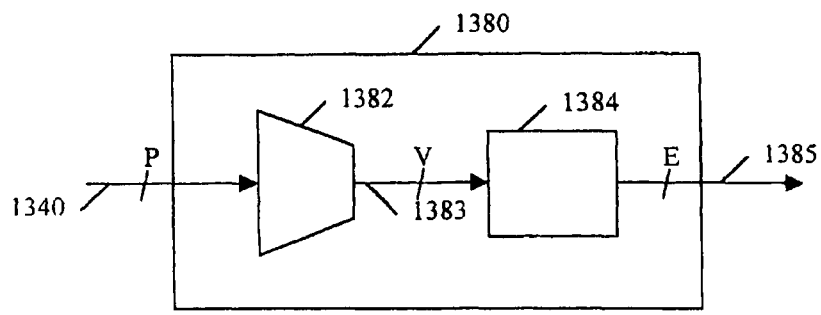
FIG. 13C shows a generic pixel sub-sampler.

FIG. 13C shows further details of a generic pixel sub-sampler 1380. When a pixel is scanned from video memory along path 1340, it has an original pixel bit width, P. A pixel extractor 1382 extracts a subset of bits from each pixel with a value bit width, V, along value path 1383. The value bit width V is less than the pixel bit width P. A coder 1384 takes the V bits from the pixel path 1383 and outputs a code with an encoded bit width, E, as the data value along path 1385. One embodiment of the coder is a null coder, or pass-through coder. Another embodiment of the coder uses an encryption table to encrypt the data value as an encrypted data value.

FIGS. 13D through 13J show embodiments of pixel sub-samplers.

Figure 13D:
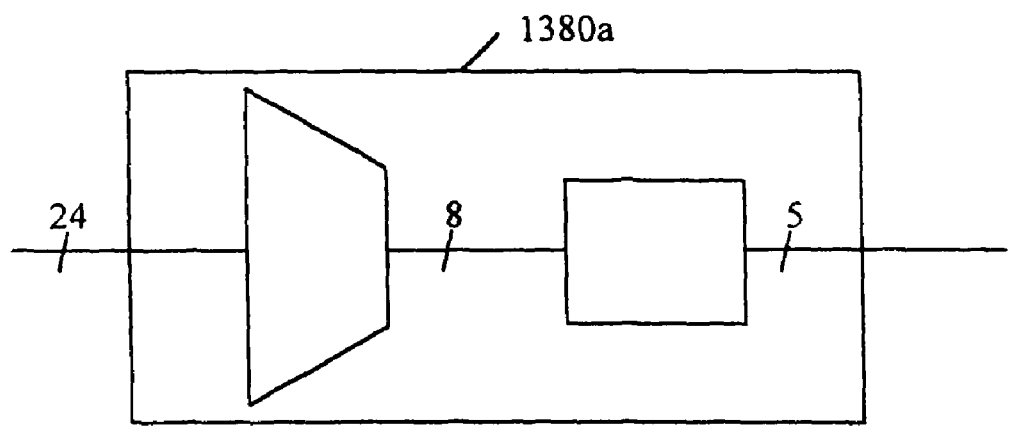
FIGS. 13D through 13J show embodiments of pixel sub-samplers.

FIG. 13D illustrates a 24 to 5 bit sub-sampler 1380*a*, where the pixel bit width, P, is 24; the value bit width, V, output from the pixel extractor 1382 is 8 (see FIG. 2H); and the encoded bit width, E, output from the coder 1384 is 5. In this embodiment, the extracted 8 bits could be any component of the grayscale (e.g. FIG. 2G) or the high order 8 bits of the 24-bit value.

Figure 13E:
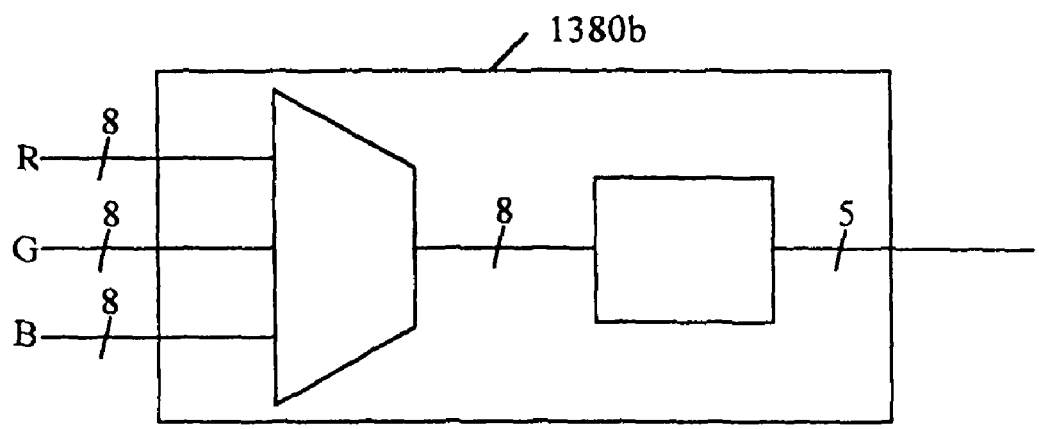

FIG. 13E illustrates a 24 bit RGB to 5 bit sub-sampler 1380*b*, where the pixel bit width, P, is 24 divided into 8 bits of red, green, and blue (RGB, see FIG. 2B); the value bit width, V, output from the pixel extractor 1382 is 8; and the encoded bit width, E, output from the coder 1384 is 5. In this embodiment, the extracted 8 bits could be an average (e.g. FIG. 2C) or one of the colors (e.g. FIG. 2D, 2E, or 2F).

Figure 13F:
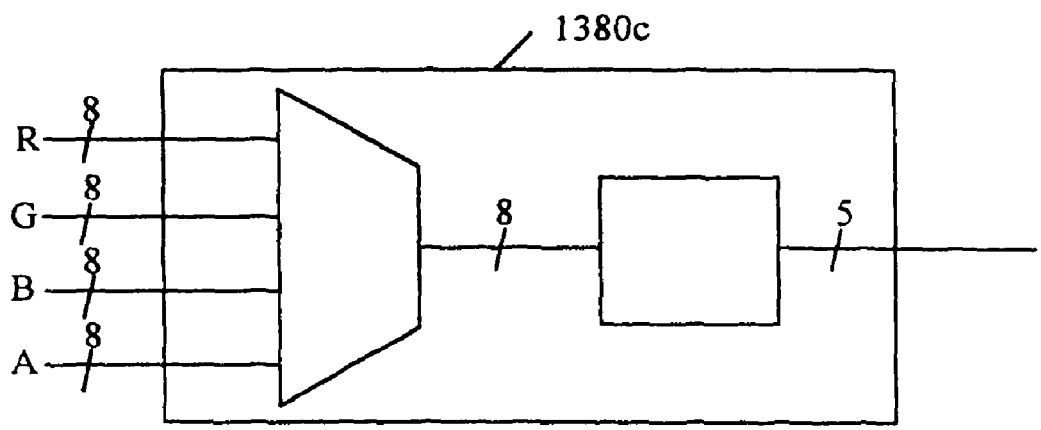

FIG. 13F illustrates a 32-bit RGB to 5 bit sub-sampler 1380*c*, where the pixel bit width, P, is 32 divided into 8 bits of red, green, blue, and alpha (see FIG. 2A); the value bit width, V, output from the pixel extractor 1382 is 8; and the encoded bit width, E, output from the coder 1384 is 5. In this embodiment, the extracted 8 bits could be an average (e.g. FIG. 2C) or one of the colors (e.g. FIG. 2D, 2E, or 2F).

Figure 13G:
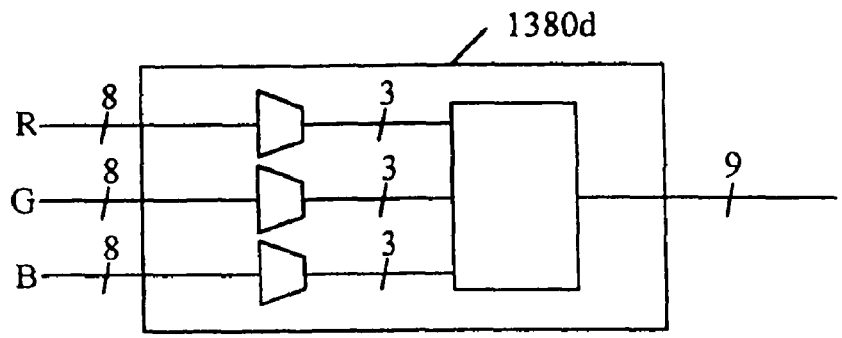

FIG. 13G illustrates a color 9-bit sub-sampler 1380*d*, where the pixel bit width, P, is 24 divided into 8 bits each of red, green, and blue; the value bit width, V, output from the pixel extractors 1382 is 9; and the encoded bit width, E, output from the coder 1384 is 9. In this embodiment, the high order 3 bits of each color component are selected (e.g. ZL9C shown FIG. 8B).

Figure 13H:
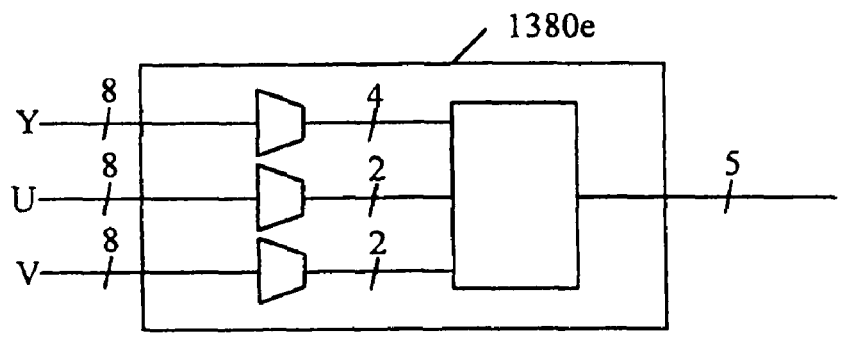

FIG. 13H illustrates a YUV sub-sampler 1380*e*, where the pixel bit width, P, is 24 divided into 8 bits for each of YUV; the value bit width, V, output from the pixel extractors 1382 is 8; and the encoded bit width, E, output from the coder 1384 is 5. In this embodiment, four bits of the Y value is extracted and 2 bits of each of the U and V values are extracted. This 8 bit value is further coded as a 5 bit value.

Figure 13I:
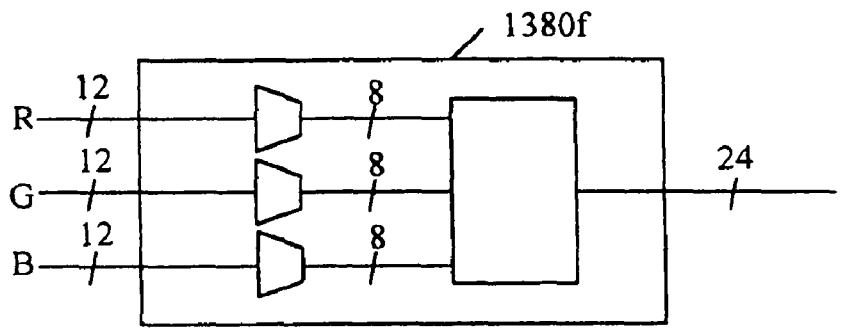

FIG. 13I illustrates a 36-bit RGB to 24-bit sub-sampler 1380*f*, where the pixel bit width, P, is 32 divided into 12 bits each of red, green, and blue; the value bit width, V, output from the pixel extractors 1382 is 24; and the encoded bit width, E, output from the coder 1384 is also 24. In this embodiment, the high order 8 bits of each 12-bit color component are selected.

Figure 13J:
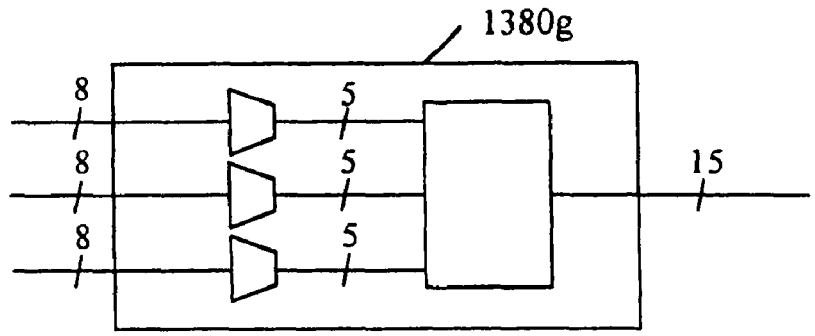

FIG. 13J illustrates a 15-bit sub-sampler 1380*g*, where the pixel bit width, P, is 24 divided into 8 bits from each color component; the value bit width, V, output from the pixel extractor 1382 is 15; and the encoded bit width, E, output from the coder 1384 is 15. In this embodiment, the high order 5 bits of each 8-bit color component are selected.

Figure 14A:
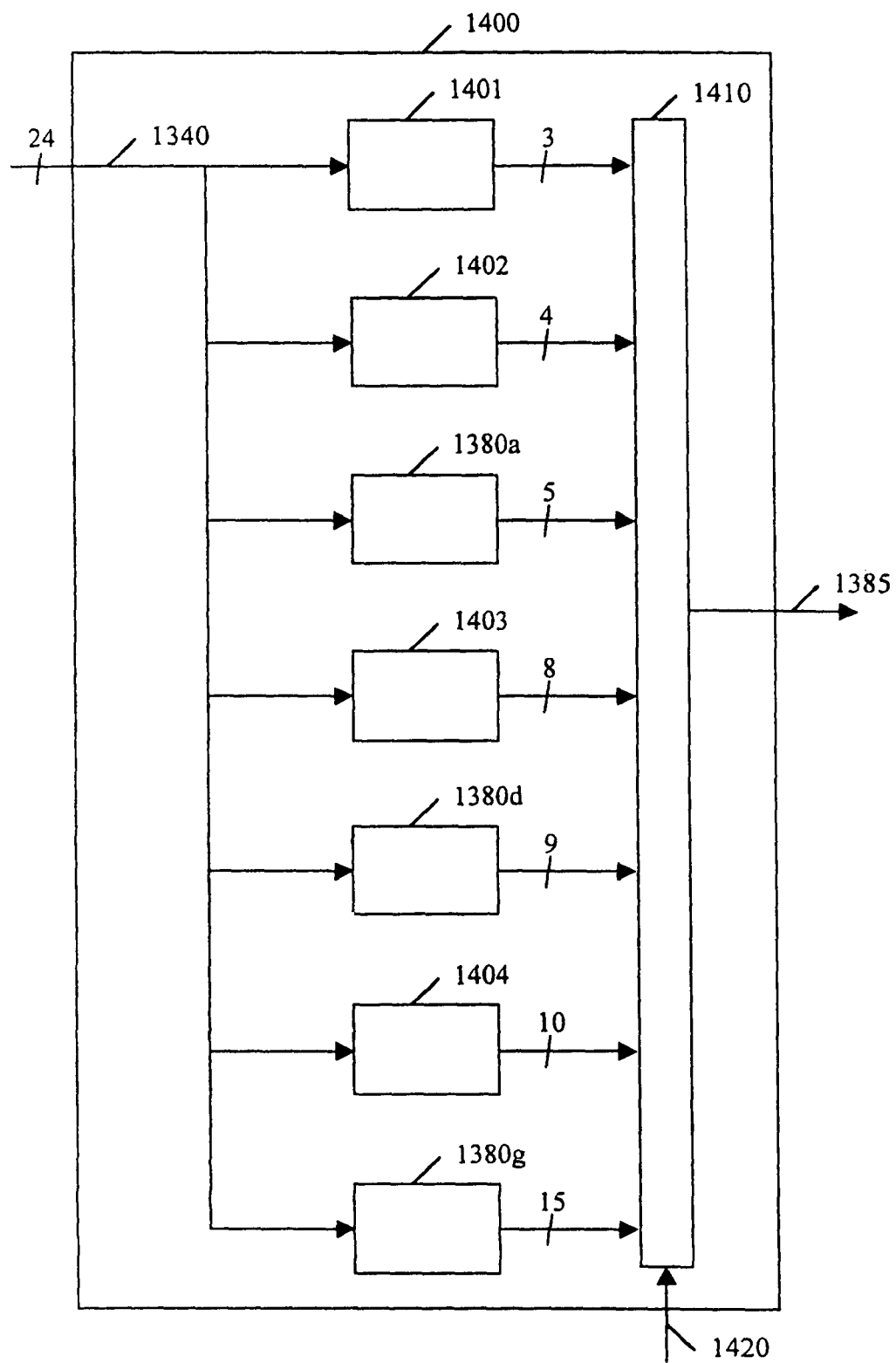
FIGS. 14A through 14C shows embodiments of a machine element for variably altering the number of bits.
Figure 14B:
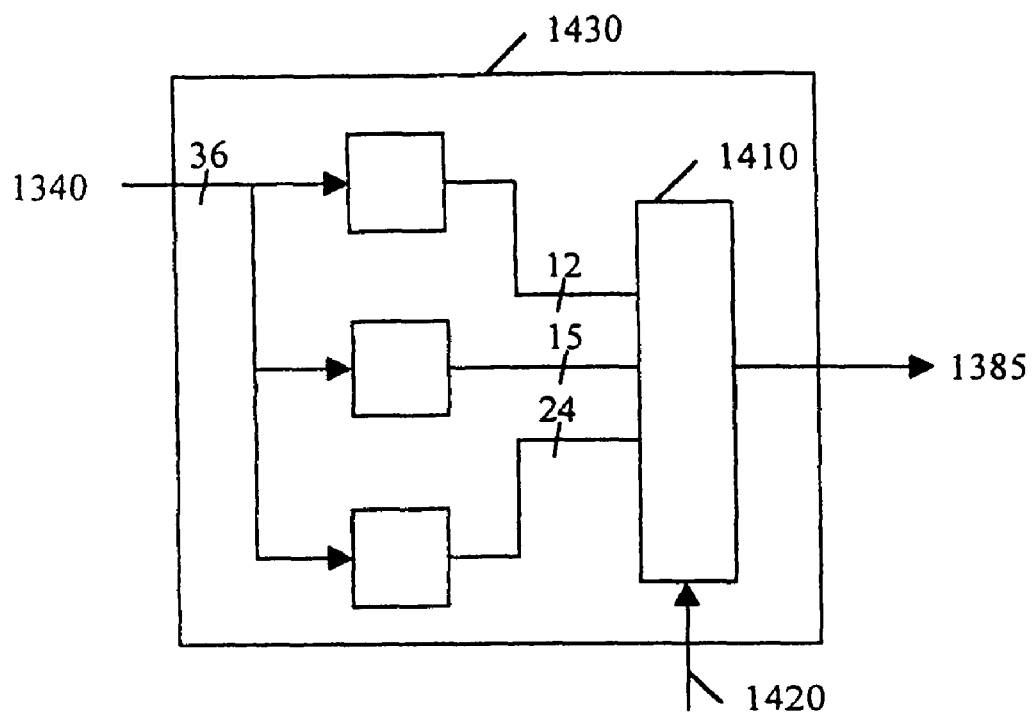
Figure 14C:
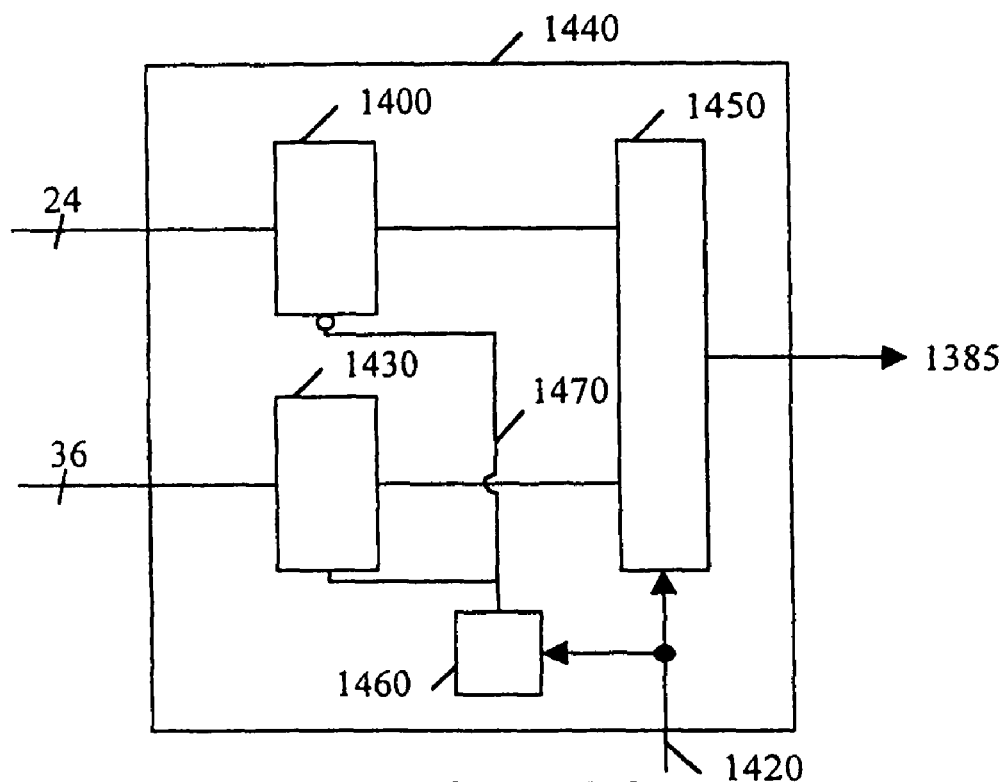

FIGS. 14A Through 14C—Variable Selection of Bit-Wise Sub-Sampling

FIGS. 14A through 14C shows embodiments of a device for variably altering the number of bits.

FIG. 14A illustrates 24-bit to variable bit sub-sampler 1400. When a pixel is scanned from video memory along path 1340, it has an original pixel bit width, P, equal to 24 bits. These 24 bits are passed as input to a number of sub-samplers. The variable number of bits is selected by a number of bits selector 1410 as indicated by a number of bits indicator 1420 and outputs a code with an variable encoded bit width, E, as the data value along path 1385. A user at remote receiver 1610 sets the number of bits indicator 1420 (see discussion regarding FIGS. 16A and 16B). The variable bit sub-sampler comprises a generic 3-bit sub-sampler 1401, a generic 4-bit sub-sampler 1402, generic 8-bit sub-sampler 1403, and generic 10-bit sub-sampler 1404 which are embodiments of the generic sub-sampler shown in FIG. 13C with specific values for E. The variable bit sub-sampler further comprises nested sub-samplers: the 24 to 5 bit sub-sampler 1380a of FIG. 13D, the 1380d of FIG. 13G, and the 15-bit sub-sampler 1380g of FIG. 13J. This is illustrative of the types of bit sub-samplers that can be variably selected.

Likewise, FIG. 14B illustrates a 36-bit to variable bit sub-sampler 1430, where P is 36 and the number of bit that can be selected are 12, 15, or 24, respectively.

FIG. 14C shows that the 24-bit to variable bit sub-sampler 1400 of FIG. 14A and the 36-bit to variable bit sub-sampler 1430 of FIG. 14B can be further combined to form at 24/36 bit variable bit sub-sampler 1440 where a second selector 1450 is used to selected either the 24 bit inputs or the 36 bit inputs using selection logic 1460 that also receives the number of bits indicator 1420. In this way any number of bits may reasonably be selected from either a 36 or 24-bit pixel bit width.

Figure 15:
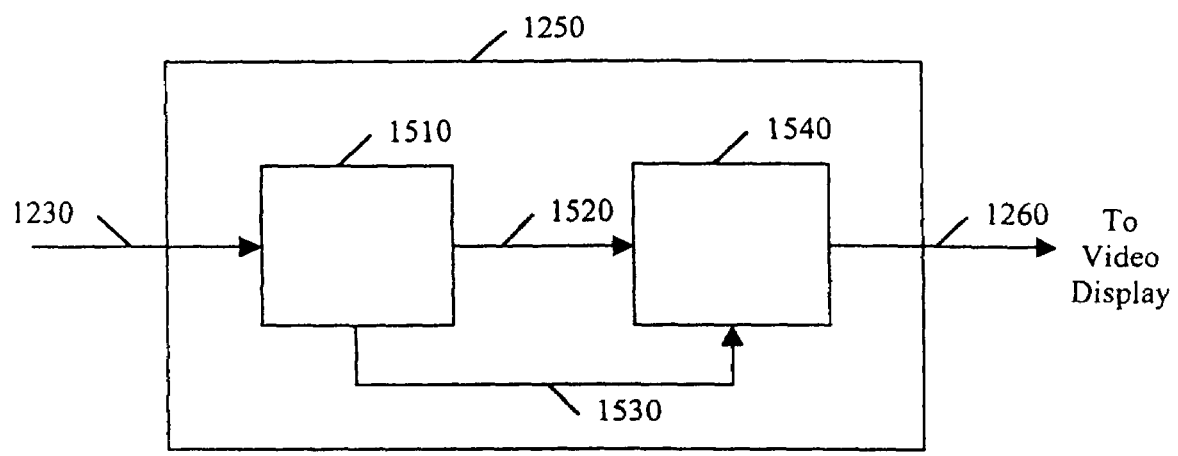
FIG. 15 shows elements of a decompressor.

FIG. 15—Decompressor Elements

FIG. 15 shows details of an embodiment of the decompressor 1250, which comprises a decoding circuit 1510 which inputs received encoded data 1230 and outputs decoded pixel values 1520 to an image memory 1540. A decoder pixel index 1530 selects the location in the image memory 1540 to store the decoded pixels values 1520. The image memory 1540 delivers each decoded video frame 1260 to the video display.

Figure 16A:
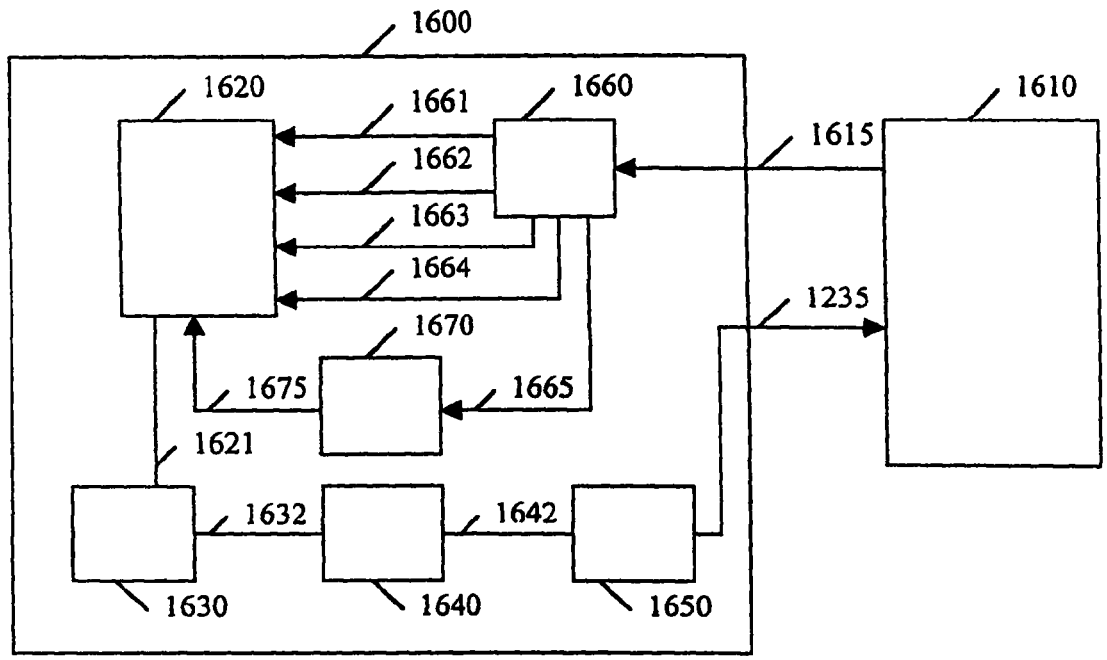
FIG. 16A shows elements for setting width, height, frame rate, brightness, and contrast which are variably altered by a receiver.
Figure 16B:
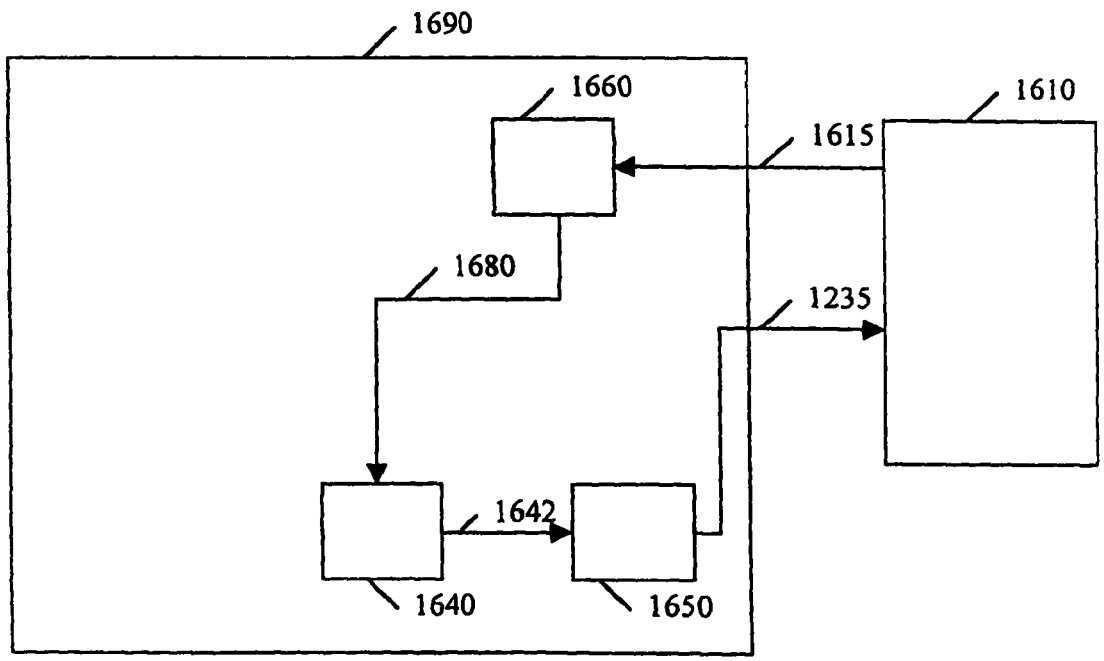
FIG. 16B shows elements for setting the number of pixel bits that are variably altered by a receiver.

FIGS. 16A and 16B—Parameters Altered by a Remote Receiver

FIG. 16A shows a system for setting width, height, frame rate, brightness, and contrast in a transmitter 1600 which are variably altered by a receiver 1610. The receiver sends commands to the transmitter 1600 via setting control path 1615. The commands alter the transmitter settings 1660.

The settings 1660 include brightness 1661, contrast 1662, height 1663, width 1664, and frame rate 1665. The brightness 1661, contrast 1662, height 1663, and width 1664 setting alter the attributes of each frame as it is digitized in a frame sub-sampler 1620. The brightness 1661 and contrast 1662 settings alter the video digitizer 1310 (FIG. 13A) as it senses the video frame. The height 1663 and 1664 allow for optionally selecting a subset area of each frame; this is area sub-sampling. Alternatively, height 1663 and 1664 allow for optionally selecting a subset of pixels from an array of pixels that make up a single frame, by skipping pixels in a row or by skipping rows; this is image sub-sampling. The frame rate 1665 setting alters the frame selector 1670 which drives the frame select indicator 1675 to optionally sub-sample frames from a sequence of video frames; this is frame sub-sampling.

The frame sub-sampler 1620 outputs a selected frame 1630 along path 1621. The transmitter pixel sub-sampler 1640 scans the selected frame 1630 getting each pixel from frame 1632 and outputs data values along path 1642 to a run length encoder 1650. The encoded data stream 1235 is then transmitted to the remote receiver 1610.

FIG. 16B shows additional elements of a system for setting the number of pixel bits in an alternate transmitter 1690 which is variably altered by a receiver 1610. The receiver sends commands to the transmitter 1600 via setting control path 1615. The commands alter the transmitter settings 1660. The settings include a number of pixel bits setting 1680 which affect the number of bits selected by the transmitter pixel sub-sampler 1640. The pixel sub-sampler 1640 could be any pixel sub-sampler, for example, see FIG. 13C through 13J and 14A through 14C. The transmitter pixel sub-sampler 1640 scans the selected frame 1630 (as in FIG. 16A) getting each pixel from frame 1632 and outputs data values along path 1642 to a run length encoder 1650. The encoded data stream 1235 is then transmitted to the remote receiver 1610.

These embodiments illustrate the novel feature of the present invention of allowing a user at a remote receiver 1610 to control aspects of the transmitter 1600 or 1690 from a remote location, including brightness, contrast, frame dimensions, frame rate, image area, and the type of compression used.

Figure 17:
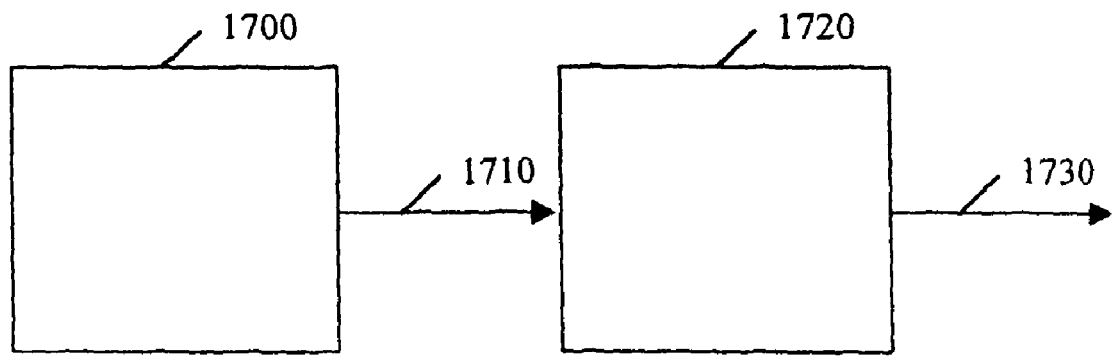
FIG. 17 shows a lossless compression step for further compression of an encoded data buffer.

FIG. 17—Further Lossless Compression Step

FIG. 17 shows a lossless compression step for further compressing an encoded data buffer. After a run-length encoding step 1700 in the transmitter, a run-length encoded output 1710 can be further processed with a further lossless compression step 1720 resulting in further lossless compression output 1730. The further lossless compression step 1720 could be implemented as a variable length coding, arithmetic coding, or other compression step known in the art.

Figure 18:
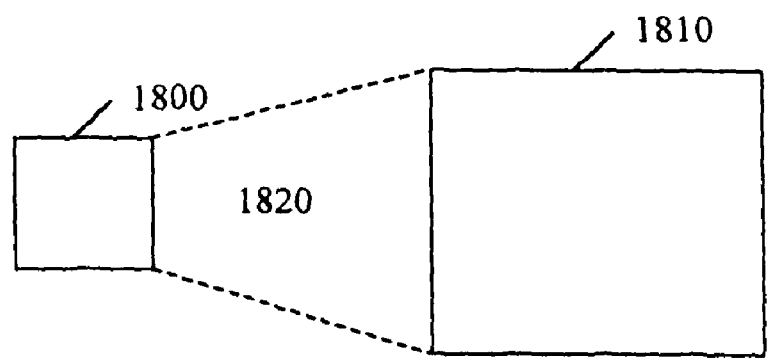
FIG. 18 shows images being enlarged by stretching.

FIG. 18—Image Stretching

FIG. 18 shows images being enlarged by stretching. An unstretched frame 1800 is stretched during stretching step 1820 resulting in an enlarged image 1810. When a frame is image sub-sampled or area sub-sampled, the remaining data can be stretched to fill the full display area on the receiver 1610. This results in an interpolated image or magnified image, respectively.

Figure 19A:
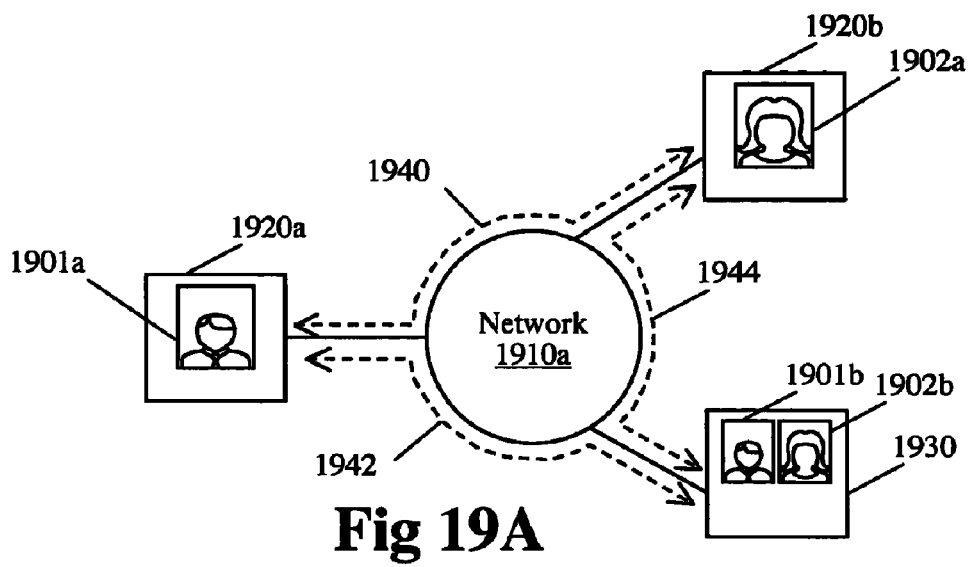
FIGS. 19A through 19C show various network configuration comprising handheld video devices.
Figure 19B:
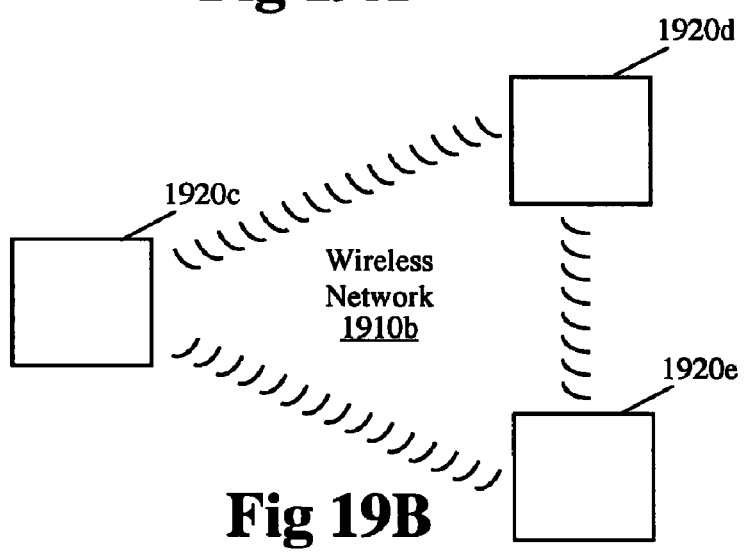
Figure 19C:
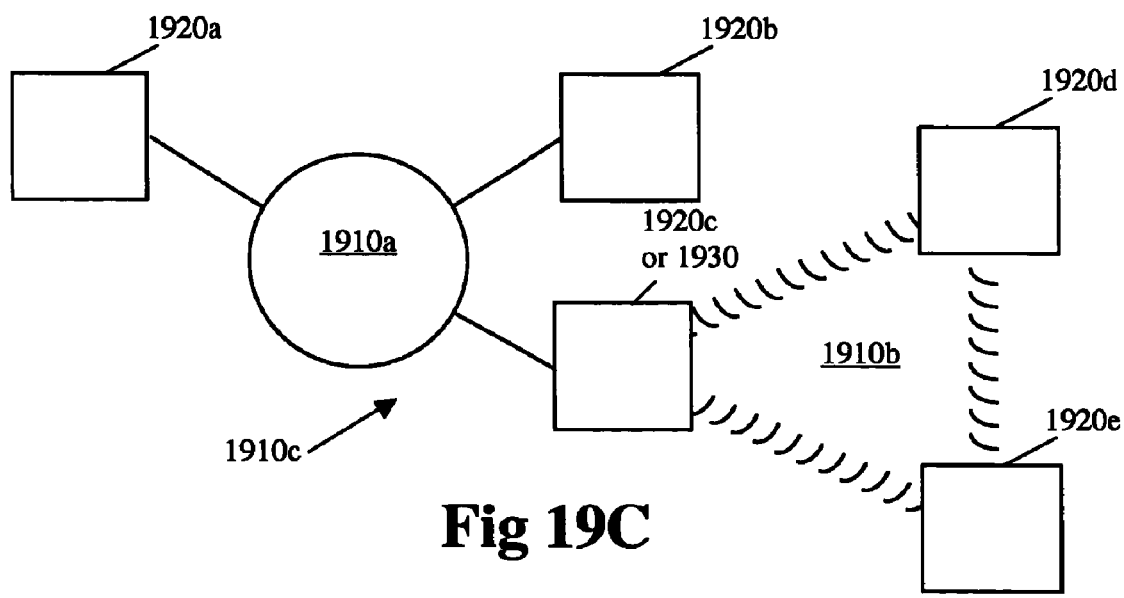

FIGS. 19A Through 19C—Handheld Video Transmission Networks

FIGS. 19A through 19C show various network configuration comprising handheld video devices.

FIG. 19A illustrates an exemplary network 1910 comprising a first node 1920a, a second node 1920b, and an optional reflector 1930. The network 1910 is shown as a wired network 1910a. The first node 1920a is displaying a first video 1901a of a man. The second node 1920b is displaying a second video 1902a of a woman. This illustrates a videoconference between the man at the second node 1920b and the woman at the first node 1920a. In the first mode of operation, the respective videos are transmitted over a point-to-point transmission 1940 path between the two nodes over the network 1910. In another mode of operation each of the videos is transmitted to the reflector where both videos are displayed as first reflected video 1901b and second reflected video 1902b. The second video 1902a originates at the first node 1920a is transmitted to the reflector over first indirect path 1942. The second video 1901a originates at the second node 1920b is transmitted to the reflector over second indirect path 1944. The reflector then retransmits the two videos to the respective display nodes, 1920a and 1920b, over the indirect paths. In other configurations, the reflector would also transmit the combined video to other nodes participating in the videoconference.

FIG. 19B shows an example of three nodes, third node 1920c, fourth node 1920d, and fifth node 1920e in a wireless network. The wireless connections are shown as waves. The three nodes operate in the same manner as the three nodes in FIG. 19A.

FIG. 19C shows an example of a combined network 1910c where five nodes are connect in a network comprised of both a wired network 1910a and a wireless network 1910b. Any of the five nodes could transmit video to any of the other nodes in the combined network. Any node, for example third node 1920*c* as shown, could act as a reflector 1930.

In another embodiment of the present invention, any node could act as a video server and transmit pre-recorded video to one or more other nodes.

These illustrations are exemplary. In practice, combined networks could consist of any number of nodes. Any of the nodes in the network could be a handheld video device.

FIGS. 20A Through 20D—Handheld Video Devices

FIGS. 20A through 20D show various embodiments of handheld video devices.

FIG. 20A shows a handheld video transmitter comprising a video source 2052, a video transmitter 2054, and video storage 2056.

FIG. 20B shows two handheld video devices in communication over either a wireless connection 2050 or a wired connection 2051.

A first handheld device 2010 comprises a display 2012, manual controls 2014, a wireless port 2016, and a first wired connection 2051*a*. While either the wireless port 2016 or the wired connection 2051*a* could be present, only one of the two would be necessary to receive video from or transmit video to other nodes in the network 1910. In this example, the first handheld device is shown as an iPod-type device with an internal hard disk drive. The first handheld device 2010 further comprises a headphone 2020, connected via a speaker/microphone cable 2024, and a camera 2030, connected via a camera cable 2034. The headphone 2020 comprises a right speaker 2021, a microphone 2022, and a left speaker 2023. The camera 2030 has a lens 2032 and internal circuitry that converts the light that passes through the lens 2032 into digital video data.

In the best mode for this embodiment, the iPod-type device is implemented using a standard Apple iPod (enhanced with an audio input for the microphone and, optionally, with a wireless port, and appropriate software), and the camera 2030 is implemented using an iBot Firewire camera manufactured by Orange Micro, a lower performing Connectix USB camera, or similar camera. Alternatively, if the iPod-type device were only used of viewing video, the Apple iPod could be used without hardware modification. In another variation, the microphone could be build into the camera (not shown) instead of the headphones.

A second handheld device 2040 comprises a second display 2012*b*, a second wireless port 2016*b*, and *a* second wired connection 2051*b*. While either the wireless port 2016*b* or the wired connection 2051*b* could be present, only one of the two would be necessary to receive video from or transmit video to other nodes in the network 1910. In this example, the second handheld device is shown as a device with a touch screen. The second handheld device 2040 further comprises a right built-in speaker 2021*b*, a built-in microphone 2022*b*, a left built-in speaker 2023*b*, and *a* built-in camera 2030*b* with lens 2032.

The configuration of the second handheld device 2040 has the advantage of eliminating the cables for the external headphone and camera of the first handheld device 2010 by having all elements built-in.

These two devices are exemplary. A two-device handheld videoconferencing network could have two identical handheld devices, such as the first handheld device 2010. Further, a single device with a camera (as shown) could transmit video for display on any number of hand held devices that do not have cameras or microphones.

FIG. 20C illustrates an integrated handheld device 2060 comprising an iPod type device 2010, an A/V module 2062 and an optional wireless module 2064. The iPod type device 2010 comprises display 2012, controls 2014, and a wired connection 2051. The A/V module 2062 comprises a right integrated speaker 2021*c*, an integrated microphone 2022*c*, a left integrated speaker 2023*c*, and *a* integrated camera 2030*c* with lens 2032. The A/V module 2062 could be manufactured and marketed separately (as shown) as an add-on module for standard iPods, or could be incorporated into the iPod packaging as an enhanced iPod-type device. The wireless module 2064 comprises an integrated wireless port 2016*c*. The wireless module 2064 also could be manufactured and marketed separately (as shown) as an add-on module for standard iPods, or could be incorporated into the iPod packaging as an enhanced iPod-type device.

The configuration of the integrated handheld device 2060 has the advantage of eliminating the cables for the external headphone and camera of the first handheld device 2010 by having all elements integrated into removably attached modules that form a single unit when attached. The user can configure the standard iPod based on the user's intended use. If only a wireless connection is needed, only the wireless module 2064 can be attached to the iPod; in this configuration video can be received and displayed but not transmitted. If only video transmission is necessary and a wired connection is convenient, the wireless module 2064 can be omitted. Either configuration provides a single integrated unit that can be carried in the user's pocket and can store and display videos.

FIG. 20D illustrates an cellular integrated device 2070 comprising phone display 2012*d*, phone controls 2014*d* (including a number keypad), a cellular port 2016*d*, a right phone speaker 2021*d*, a phone earphone 2021*e*, phone microphone 2022*d*, left phone speaker 2023*d*, and *a* phone camera 2030*d* with lens 2032.

Any of the handheld devices shown in FIGS. 20A through 20D could be nodes in video transmission networks, such as those shown in FIGS. 12D and 19A through 19C. Each transmitting device preferably would include a compressor 1210 as shown in FIGS. 12A and 12D. Each receiving device preferably would include a decompressor 1250 as shown in FIGS. 12B and 12D. The compressor 1210 and decompressor 1250 preferably would implement one or more embodiments of the compression methods discussed above.

Figure 21C:
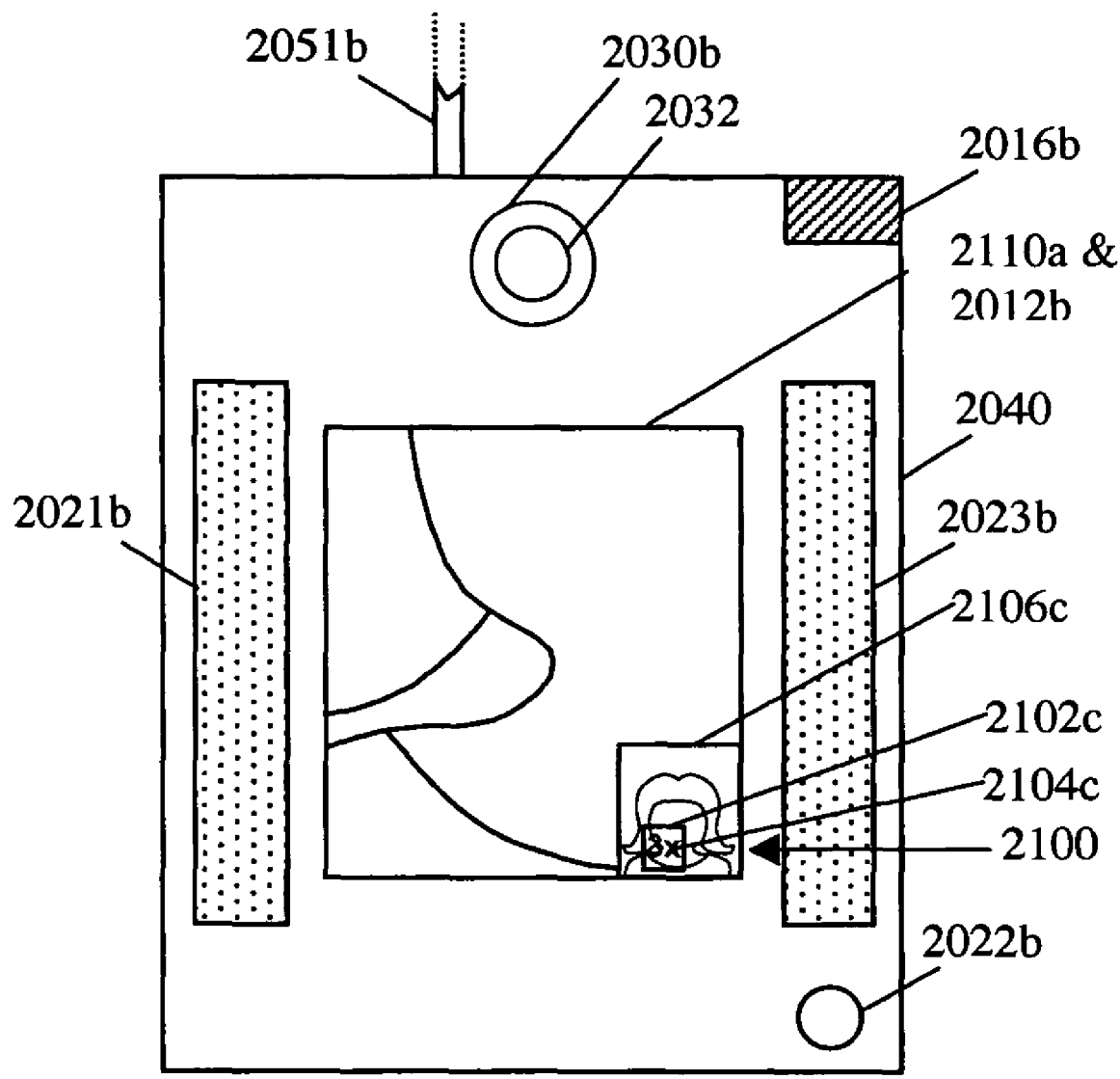

FIGS. 21A Through 21C—Handheld Video Devices with Graphical Zoom Control

FIGS. 21A through 21C show exemplary handheld video devices comprising graphical zoom controls.

A graphical user interface (GUI) graphically corresponds to a video display window 2110 through which a single image or a stream of video frames is displayed. The GUI and the video display window 2110 are displayed on a display 2012 (or 2012*b* or 2012*d*). The GUI includes a zoom control 2100 having an inner region 2102 positioned within an outer region 2106. The zoom control 2100 is a graphical way for the user of a remote receiver 1610 (see FIGS. 16A and 16B) to send remote control commands to set the parameters of a video transmitter (1600 or 1690) for control the area of the video to be compressed and transmitted.

FIG. 21A shows an embodiment of the iPod-type handheld device 2010 of FIG. 20C displaying a zoom control 2100 having an inner region 2102*a* positioned within an outer region 2106*a*. The zoomed video image is show in video display window 2110*a*. In this embodiment the zoom control 2100 is displayed on top of the video display window 2110*a*. The size and position of the inner region 2102*a* relative to the outer region 1206*a* shows the user which portion of the original video is being received and magnified. Only the selected portion of the original video (in this example, the hair and top of the face) needs to be transmitted in full resolution or high quality. A low resolution, or thumbnail version of the original video frame is optionally displayed in the outer region 2106a. The thumbnail can be updated at a rate slower than the frame rate of the magnified video, such as once or twice a second. The magnification factor 2104a shows the text 2× showing that the portion being displayed in the video display window 2110a is being displayed at twice the size.

FIG. 21B shows an embodiment of the cellular integrated device 2070 of FIG. 20D displaying a zoom control 2100 having an second inner region 2102b positioned within an second outer region 2106b. The zoomed video image is shown in alternate video display window 2110b. In this embodiment, the zoom control 2100 is displayed outside and below the alternate video display window 2110b. The size and position of the second inner region 2102b relative to the second outer region 1206b shows the user which portion of the original video is being received and magnified. Only the selected portion of the original video (in this example, the lower face and tie) needs to be transmitted in full resolution or high quality. A low resolution, or thumbnail version of the original video frame is optionally displayed in the second outer region 2106b. The second magnification factor 2104b shows the text 2× showing that the portion being displayed in the alternate video display window 2110b is being displayed at twice the size.

FIG. 21C shows an embodiment of the second handheld device 2040 of FIG. 20B displaying a zoom control 2100 having an third inner region 2102c positioned within an third outer region 2106c. The zoomed video image is shown in a video display window 2110a shown filling the second display 2112b. In this embodiment, the zoom control 2100 is displayed over the video display window 2110a. The size and position of the third inner region 2102c relative to the third outer region 1206c shows the user which portion of the original video is being received and magnified. Only the selected portion of the original video (in this example, the right shoulder of the woman) needs to be transmitted in full resolution or high quality. A low resolution, or thumbnail version of the original video frame is optionally displayed in the third outer region 2106c. The third magnification factor 2104c shows the text 3× showing that the portion being displayed in the video display window 2110a is being displayed at three times the size. In this embodiment the controls (similar in function to controls 2014) are incorporated into a touch screen of the second display 2012b. The user enters zoom in, zoom out, and pan commands by tapping the third inner region 2102c or the third outer region 2106, or by selecting and dragging the outline of the third inner region 2102c.

Operation of Graphical Zoom Controls

A user controls aspects and changes parameters of the image displayed within the video display window 2110 using the controls 2014 to enter input commands within the zoom control 2100 by selecting appropriate parts of the controls 2104 (or regions of the zoom control 2100 on a touch screen or with a pointing device). The controls 2014 can be a touch screen, touch pad, iPod-like scroll pad, remote control or other device, depending on the configuration of the handheld device.

The size of the inner region 2102 relative to the outer region 2106 represents the magnification of the portion of the image being displayed within the video display window 2110. A magnification factor 104 representing the current magnification of the image being displayed within the video display window 2110 from the original image is displayed within the inner region 2102. The magnification of the image being displayed is increased by tapping within the inner region 2102, or while in zoom control mode, pressing the "zoom in" button on a iPod-type control 2104 or cell phone control 2014d. As the magnification is thus increased, the size of the inner region 2102 is decreased appropriately relative to the outer region 2106 and the magnification factor 104 is appropriately incremented. The magnification of the image being displayed is decreased by tapping outside of the inner region but inside of the outer region, or while in zoom control mode clicking the "zoom out" button on a iPod-type control 2104 or cell phone control 2014d. As the magnification is thus decreased, the size of the inner region 102 is increased appropriately relative to the outer region 2106 and the magnification factor 104 is appropriately decremented.

The position of the inner region 2102 within the outer region 2106 represents the portion of the entire original image being displayed within the video display window 2110. The portion of the image being displayed within the video display window 2110 is changed by moving the inner region 2102 to the desired position within the outer region 2106 using the touch screen, a pointing device, or the controls 2014 or 2014d. As the position of the inner region 2102 changes within the outer region 2106, the portion of the image displayed within the video display window 2110 changes appropriately.

The display 2012 including the video display window 2110 and a graphical user interface including the zoom control 2100, according to the present invention. The zoom control 2100 of the present invention preferably includes two regions 2102 and 2106. The outer region 2106 forms the outer edge of the zoom control 2100 and represents the entire available original image. The inner region 2102, is included and positioned within the outer region 2106 and represents a region of interest of the original image currently being displayed within the video display window 2110. Within the inner region 2102, a magnification factor 104 is optionally displayed, representing the current magnification being applied to the image displayed within the video display window 2110.

The magnification factor 104 is changed by using the touch screen or controls 2014 (or 2014d) to zoom in or zoom out. By zooming in a number of times, the inner region 102 becomes continually smaller in size and the magnification factor 104 is incremented a number of times equal to the number of times that the control zoomed in.

A user zooms out on a specific portion of the image to decrease the magnification factor 104; the inner region 102 becomes appropriately larger in size and the magnification factor 104 is decremented. By zooming out a number of times, the inner region 102 becomes increasingly larger with each zoom out and the magnification factor 104 is decremented a number of times equal to the number of times the user zooms out, until the magnification factor is equal to 1.

The inner region 2102 also has a pan or positional feature within the outer region 2106, such that the position of the inner region 2102 within the outer region 2106 represents the portion of the entire original image that is being displayed within the video display window 2110. The position of the inner region 2102 is changed within the outer region 2106 by using the touch screen, a pointing device, or controls 2014 to move the inner region 2102 to the desired position within the outer region 2106. Accordingly, the inner region 2102 graphically represents what portion of the entire image is currently being displayed within the video display window 2110 and what magnification factor 104 is currently being used to make this selected portion of the original image fit within the video display window 2110.

ADVANTAGES

Video Coverage of Remote Events

The present invention will allow low cost, portable, video transmission of events of interest whenever and wherever they happen. These handheld wireless video transmitters will be able to provide news coverage of wars, natural disasters, terrorist attacks, traffic and criminal activities in a way that has never before been possible.

Improved Continuous Communication

The present invention will enabled enhanced personal communication between friends, family, and co-workers in ways never before possible.

Improved Entertainment and Education

The present invention will enabled the transmission of video-based entertainment and education in ways never before possible. User will be able to use pocket-sized, handheld device to watch video that are downloaded from a global media exchange, streamed from a video server, or transmitted live from a performance, classroom, laboratory, or field experience.

Improved Healthcare

The present invention would enable a physician or medical specialist to receive medical quality video any time in any location. For example, a critical emergency room ultrasound study could be monitored while it is being performed by less skilled emergency room personnel ensuring that the best medical image is acquired. A rapid diagnosis can be made and the results of a study can be verbally dictated for immediate transcription and use within the hospital.

Further, the present invention could be used to transmit medical quality video from a remote, rural location, including a battle ground. It could also be used to transmit guidance and advice from an expert physician into a remote, rural location.

Thus, the present invention can improve medical care, reduce the turnaround for analysis of medical studies, reduce the turnaround for surgery, and provide medical professionals with continuous access to medical quality imaging.

Noise Filtering and Image Enhancement

The removal of the least significant bits of pixel values results in high quality decompressed images when the original image is generated by an electronic sensing device such as an ultrasound machine which is generating only a certain number of bits of grayscale resolution. By variably altering the number of most significant bits, various filters can be implemented to enhance the image quality. Such a noise filter can be beneficial when the image is generated by an imaging technology such as radar, ultrasound, x-ray, magnetic resonance, or similar technology. Variations can be made to enhance the perceived quality of the decompressed image. Therefore, altering the number of data bits selected and altering the width of the repeat count is anticipated by this invention and specific values in the examples should not be construed as limiting the scope of this invention.

Dynamic Variable Formats

While a video stream is being viewed a viewer on the decoding end of the transmission can vary the settings for the compressor. Different tradeoffs between image spatial and temporal quality can be made. As the contents of the video signal change an appropriate format can be selected. Control signals can be sent back to the compressor via a communications link.

Execution Speed

The preferred embodiment of this invention uses a number of techniques to reduce the time required to compress and decompress the data.

The methods require only a single sequential pass through the data. Both the compression steps 100 and the decompression steps 150 access a pixel once and perform all calculations.

When selecting the filtered pixel value 299, the preferred embodiment selects the low order byte from the 32 bit pixel value 200 or the 24 bit pixel value 210 so that an additional shift operation or addressing operation is avoided.

The shift operation is a fast and efficient way to convert a byte or word to the filtered pixel value 299.

GENERAL PURPOSE

The lossless compression of the sampled data achieved by the preferred embodiment of the present invention results in high quality video streams that have general purpose application in a number of areas including, without limitation, video conferencing, surveillance, manufacturing, rich media advertising, and other forms of video transmission, storage, and processing.

Lossless Nature/No Artifacts

Once the analog signal is sub-sampled and filtered to select a filtered pixel value that eliminates some of the real world defects, the methods of the present invention compress and decompress the data with no irreversible data loss. Unlike JPEG and MPEG, the decompressed image never suffers from artificially induced blocking or smearing or other artifacts that are result of the lossy compression algorithm itself. As a result even a small sub-sample of the image remains clear and true to the perceived quality of the original image.

Superior Features Over RHN Format

When compared against the RHN format, the format and methods of the present invention provide a number of advantages, including, but not limited to, faster speed and smaller size of encoded data, better performance for both medical and typical video images, and a typically closer representation of the original video signal.

CONCLUSION, RAMIFICATION, AND SCOPE

Accordingly, the reader will see that handheld wireless devices are used to receive and display high quality video. The video can be displayed as it is received live and a graphical zoom control can be used to dynamically control the area of the source image that is to be transmitted in full resolution. In other embodiments, a handheld wireless device captures the video with an attached video camera and microphone and the device transmits the video images live as they are captured. A single handheld wireless video transmitter can transmit to multiple handheld wireless receivers. A plurality of handheld wireless video devices which capture, transmit, receive, and display video over a network are used for mobile video conferencing. In other embodiments the video data is transferred as a video file or streamed from a video server contain pre-recorded video files.

Further the compression and decompression steps of the present invention provides a means of digitally compressing a video signal in real time, communicating the encoded data stream over a transmission channel, and decoding each frame and displaying the decompressed video frames in real time.

Furthermore, the present invention has additional advantages in that:

1. it enables live video transmission and display on pocket-sized handheld devices;
2. it enables wireless videoconferencing with portable, handheld video devices;
3. it provides an iPod-type device which is able to display high quality color video;
4. it provides an iPod-type device which is able to be used as a wireless video transmitter or receiver.

5. it enables video coverage of remote events or catastrophic events;
6. it improves interpersonal communication, productivity, and effectiveness;
7. it improves education;
8. it improves entertainment;
9. it improves and expands healthcare at lower costs;
10. it provides a means of filtering real world defects from the video image and enhancing the image quality;
11. it allows for execution of both the compression and decompression steps using software running on commonly available computers without special compression or decompression hardware;
12. it provides decompressed images that have high spatial quality that are not distorted by artifacts of the compression algorithms being used;
13. it provides a variably scalable means of video compression; and
14. it provides a means for reducing the space required in a storage medium.

Although the descriptions above contain many specifics, these should not be construed as limiting the scope of the invention but as merely providing illustrations of some of the preferred embodiments of this invention. For example, the physical layout, cable type, connectors, packaging, and location of the video display or video camera can all be altered without affecting the basic elements of the claimed embodiments. Further, bit ordering can be altered and the same relative operation, relative performance, and relative perceived image quality will result. Also, these processes can each be implemented as a hardware apparatus that will improve the performance significantly.

Thus the scope of the invention should be determined by the appended claims and their legal equivalents, and not solely by the examples given.

I claim:

1. An apparatus, comprising:
   a storage medium configured to store a video frame having a plurality of pixels, wherein a pixel includes a plurality of pixel bits; and
   an encoder coupled to the storage medium and configured to bit-wise sub-sample the pixels to extract corresponding subsets of pixel bits from the pixels, count consecutive repeated instances of various pixel values represented by the extracted subsets of pixel bits, and output a series of data elements for the pixels, based on the extracted subsets of pixel bits;
   wherein a data element of the series of data elements includes a data field and a run-length field, the data field includes a pixel value in a range spanning from zero to a maximum value represent-able by a number of pixel bits sub-sampled from a pixel, and the run-length field includes a consecutive repeat count of the pixel value in the data field.

2. The apparatus of claim 1, further comprising a digitizer coupled to the storage medium and configured to generate a plurality of video frames to digitize a video, wherein the plurality of video frames include the video frame stored in the storage medium.

3. The apparatus of claim 1, wherein a pixel includes a plurality of color components, a color component includes a number of color component bits, and the plurality of pixel bits of a pixel includes the color component bits of the color components, and wherein the encoder is configured to extract a subset of pixel bits from a pixel by extracting respective most significant color component bits of the color components of the pixel.

4. The apparatus of claim 1, wherein the encoder is further configured to encode the various pixel values, and a data field in a data element includes a pixel value in an encoded form.

5. The apparatus of claim 1, wherein the encoder is further configured to variably select one of 3, 4, 5, 8, 9, 12, 15, 16, and 24, as the number of pixel bits to sub-sample from a pixel, wherein the number of pixel bits sub-sampled from a pixel is less than a number of pixel bits of the pixel being bit-wise sub-sampled.

6. The apparatus of claim 1, further comprising an interface coupled with the encoder and configured to receive a specification of the number of pixel bits to sub-sample from a pixel.

7. The apparatus of claim 6, wherein the encoder is configured to set a size of the data field to the specification of the number of pixel bits to sub-sample, and to subtract the size of the data field from a supported data size of the apparatus to derive a size of the run-length field.

8. A method, comprising:
   bit-wise sub-sampling pixels of a video frame, by an encoder, to extract corresponding subsets of pixel bits from the pixels;
   counting, by the encoder, consecutive repeated instances of various pixel values represented by the extracted subsets of pixel bits; and
   outputting a series of data elements for the pixels, by the encoder, based on the extracted subsets of pixel bits;
   wherein a data element of the series of the data elements includes a data field and a run-length field, the data field includes a pixel value in a range spanning from zero to a maximum value represent-able by a number of pixel bits sub-sampled from a pixel, and the run-length field includes a consecutive repeat count of the pixel value in the data field.

9. The method of claim 8, further comprising:
   digitizing a video, by a digitizer, and
   generating a plurality of video frames, by the digitizer, wherein the generated video frames are bit-wise sub-sampled.

10. The method of claim 8, wherein a pixel includes a plurality of color components, a color component includes a number of color component bits, and the plurality of pixel bits of a pixel includes the color component bits of the color components, and wherein extracting a subset of pixel bits from a pixel includes extracting respective most significant color component bits of the color components of the pixel.

11. The method of claim 8, further comprising encoding by the encoder, the various pixel values, wherein a data field in a data element includes a pixel value in an encoded form.

12. The method of claim 8, further comprising variably selecting, by the encoder, one of 3, 4, 5, 8, 9, 12, 15, 16, and 24, as the number of pixel bits to sub-sample from a pixel, wherein the number of pixel bits sub-sampled from a pixel is less than a number of pixel bits of the pixel being bit-wise sub-sampled.

13. The method of claim 8, further comprising receiving by the encoder, a specification of the number of pixel bits to sub-sample from a pixel.

14. The method of claim 13, further comprising:
   setting, by the encoder, a size of the data field to the specification of the number of pixel bits to sub-sample; and
   subtracting, by the encoder, the size of the data field from a supported data size of the encoder to derive a size of the run-length field.

15. An article of manufacture, comprising:
a computer-readable non-transitory storage medium; and
a plurality of instructions encoded in the storage medium, and configured to enable an apparatus, in response to execution of the instructions by the apparatus, to perform operations including:
bit-wise sub-sampling pixels of a video frame to extract corresponding subsets of pixel bits from the pixels;
counting consecutive repeated instances of various pixel values represented by the extracted subsets of pixel bits; and
outputting a series of data elements for the pixels based on the extracted subsets of pixel bits;
wherein a data element of the series of data elements includes a data field and a run-length field, the data field includes a pixel value in a range spanning from zero to a maximum value represent-able by a number of pixel bits sub-sampled from a pixel, and the run-length field includes a consecutive repeat count of the pixel value in the data field.

16. The article of claim 15, wherein a pixel includes a plurality of color components, a color component includes a number of color component bits, and the plurality of pixel bits of a pixel includes the color component bits of the color components, and wherein extracting a subset of pixel bits from a pixel includes extracting respective most significant color component bits of the color components of the pixel.

17. The article of claim 15, wherein the operations further comprise encoding the various pixel values, wherein a data field in a data element includes a pixel value in an encoded form.

18. The article of claim 15, wherein the operations further comprise variably selecting one of 3, 4, 5, 8, 9, 12, 15, 16, and 24, as the number of pixel bits to sub-sample from a pixel, wherein the number of pixel bits sub-sampled from a pixel is less than a number of pixel bits of the pixel being bit-wise sub-sampled.

19. The article of claim 15, wherein the operations further comprise receiving a specification of the number of pixel bits to sub-sample from a pixel.

20. The article of claim 19, wherein the operations further comprise setting a size of the data field to the specification of the number of pixel bits to sub-sample, and subtracting the size of the data field from a supported data size of the apparatus to derive a size of the run-length field.

21. An apparatus, comprising:
a storage medium configured to store an encoded or compressed version of a video frame, wherein the video frame has a plurality of pixels, a pixel has a plurality of pixel bits, and the version has a plurality of data elements; and
a decoder coupled to the storage medium, and configured to process the data elements to reconstitute the video frame;
wherein the data elements are outputted based on extracted subsets of the pixel bits bit-wise sub-sampled from the pixels, and wherein a data element of the outputted data elements includes a data field and a run-length field, the data field includes a pixel value in a range spanning from zero to a maximum value represent-able by a number of pixel bits sub-sampled from a pixel, and the run-length field includes a consecutive repeat count of the pixel value in the data field.

22. The apparatus of claim 21, wherein a pixel includes a plurality of color components, a color component includes a number of color component bits, and the plurality of pixel bits of a pixel includes the color component bits of the color components, and wherein the decoder is configured to reconstitute most significant color component bits of the color components of a pixel, based on the subset of pixel bits sub-sampled from the pixel.

23. The apparatus of claim 21, wherein a data field in a data element includes a pixel value in an encoded form, and the decoder is further configured to decode the various encoded pixel values.

24. The apparatus of claim 21, wherein the decoder is further configured to reconstitute the video frame, whether the encoded version were formed through 3, 4, 5, 8, 9, 12, 15, 16, or 24 bits bit-wise sub-sampling of the pixels.

25. The apparatus of claim 21, further comprising an interface configured to specify, to an encoder coupled with the apparatus, the number of pixel bits to sub-sample from a pixel.

26. A method, comprising:
receiving, by a decoder, an encoded or compressed version of a video frame, wherein the video frame has a plurality of pixels, a pixel has a plurality of pixel bits, and the version has a plurality of data elements; and
processing the data elements, by the decoder, to reconstitute the video frame;
wherein the data elements are outputted based on extracted subsets of the pixel bits bit-wise sub-sampled from the pixels, and wherein a data element includes a data field and a run-length field, the data field includes a pixel value in a range spanning from zero to a maximum value represent-able by a number of pixel bits sub-sampled from a pixel, and the run-length field includes a consecutive repeat count of the pixel value in the data field.

27. The method of claim 26, wherein a pixel includes a plurality of color components, a color component includes a number of color component bits, and the plurality of pixel bits of a pixel includes the color component bits of the color components, and wherein processing includes reconstituting most significant color component bits of the color components of a pixel, based on the subset of pixel bits sub-sampled from the pixel.

28. The method of claim 26, wherein a data field in a data element includes a pixel value in an encoded form, and said processing includes decoding various encoded pixel values.

29. The method of claim 26, wherein said processing includes processing, by the decoder, an encoded version of the video frame formed through 3, 4, 5, 8, 9, 12, 15, 16, or 24 bits bit-wise sub-sampling of the pixels.

30. The method of claim 29, further comprising specifying to an encoder, by the decoder, the number of pixel bits to sub-sample from a pixel.

31. An article of manufacture, comprising:
a computer-readable non-transitory storage medium;
a plurality of instructions encoded in the storage medium, and configured to enable an apparatus, in response to execution of the instructions by the apparatus, to perform operations including:
receiving an encoded version of a video frame, wherein the video frame has a plurality of pixels, a pixel has a plurality of pixel bits, and the encoded version has a plurality of data elements; and
processing the data elements to reconstitute the video frame;
wherein the data elements are outputted based on extracted subsets of the pixel bits bit-wise sub-sampled from the pixels, and wherein a data element includes a data field and a run-length field, the data field includes a pixel value in a range spanning from zero to a maximum value represent-able by a number of pixel bits sub-sampled from a pixel, and the run-length field includes a consecutive repeat count of the pixel value in the data field.

32. The article of claim 31, wherein a pixel includes a plurality of color components, a color component includes a number of color component bits, and the plurality of pixel bits of a pixel includes the color component bits of the color components, and wherein said processing includes reconstituting most significant color component bits of the color components of a pixel, based on the subset of pixel bits sub-sampled from the pixel.

33. The article of claim 31, wherein a data field in a data element includes a pixel value in an encoded form, and said processing includes decoding the various encoded pixel values.

34. The article of claim 31, wherein said processing includes processing an encoded version of the video frame formed through 3, 4, 5, 8, 9, 12, 15, 16, or 24 bits bit-wise sub-sampling of the pixels.

35. The article of claim 34, wherein the operations further include specifying to an encoder the number of pixel bits to sub-sample from a pixel.

* * * * *

UNITED STATES PATENT AND TRADEMARK OFFICE
CERTIFICATE OF CORRECTION

| | | |
|---|---|---|
| PATENT NO. | : 8,290,034 B2 | Page 1 of 1 |
| APPLICATION NO. | : 11/262106 | |
| DATED | : October 16, 2012 | |
| INVENTOR(S) | : Roman | |

It is certified that error appears in the above-identified patent and that said Letters Patent is hereby corrected as shown below:

In the Specifications

In Column 7, Line 25, delete "DRAWING FIGURES" and insert -- DRAWING/FIGURES --, therefor.

In Column 7, Line 31, delete "FIG." and insert -- FIGS. --, therefor.

In Column 7, Line 39, delete "FIG. 5A to 5C shows" and insert -- FIGS. 5A to 5C show --, therefor.

In Column 7, Line 54, delete "medium" and insert -- medium. --, therefor.

In Column 7, Line 62, delete "shows" and insert -- show --, therefor.

In Column 14, Line 19, delete "and U" and insert -- and U. --, therefor.

In Column 14, Line 41, delete "((P<<U)||C)" and insert -- ((P<<U)|C) --, therefor.

In Column 28, Line 67, delete "receiver." and insert -- receiver; --, therefor.

Signed and Sealed this
Ninth Day of July, 2013

Teresa Stanek Rea
*Acting Director of the United States Patent and Trademark Office*